March 8, 1966 M. A. BRESLIN ETAL 3,239,816

COMPUTER INDEXING SYSTEM

Filed July 25, 1960 14 Sheets-Sheet 1

March 8, 1966 M. A. BRESLIN ETAL 3,239,816

COMPUTER INDEXING SYSTEM

Filed July 25, 1960 14 Sheets-Sheet 2

March 8, 1966 M. A. BRESLIN ETAL 3,239,816

COMPUTER INDEXING SYSTEM

Filed July 25, 1960 14 Sheets-Sheet 4

March 8, 1966 M. A. BRESLIN ETAL 3,239,816

COMPUTER INDEXING SYSTEM

Filed July 25, 1960 14 Sheets-Sheet 5

March 8, 1966 M. A. BRESLIN ETAL 3,239,816

COMPUTER INDEXING SYSTEM

Filed July 25, 1960 14 Sheets-Sheet 10

March 8, 1966 M. A. BRESLIN ETAL 3,239,816

COMPUTER INDEXING SYSTEM

Filed July 25, 1960 14 Sheets-Sheet 12

NORMAL INSTRUCTION

LEGEND: $N$ - ADDRESS OF INSTRUCTION $N$
$(N)$ - CONTENTS OF MEMORY LOCATION $N$
$M'_N$ - M PORTION OF INST. $N$
$B_N$ - ADDRESS OF REGISTER $B_N$
$(B_N)$ - CONTENTS OF REGISTER $B_N$
$A_N$ - ADDRESS OF REGISTER $A_N$
$(A_N)$ - CONTENTS OF REGISTER $A_N$
$M_N$ - $M'_N + (B_N)$
$(A_N)'$ - RESULT OF COMPUTATION

March 8, 1966 M. A. BRESLIN ETAL 3,239,816

COMPUTER INDEXING SYSTEM

Filed July 25, 1960 14 Sheets-Sheet 13

INDEXING INSTRUCTION — TRANSFER SIGNAL RECECEIVED

LEGEND: N - ADDRESS OF INSTRUCTION N
(N) - CONTENTS OF MEMORY LOCATION N
M'N - M PORTION OF INST. N
BN - ADDRESS OF REGISTER BN
(BN) - CONTENTS OF REGISTER BN
AN - ADDRESS OF REGISTER AN
(AN) - CONTENTS OF REGISTER AN
MN - M'N + (BN)
(AN)' - RESULT OF COMUTATION

INDEXING INSTRUCTION - NO TRANSFER SIGNAL

LEGEND -
N - ADDRESS OF INSTRUCTION N
(N) - CONTENTS OF MEMORY LOCATION N
M'N - M PORTION OF INST. N
BN - ADDRESS OF REGISTER BN
(BN) - CONTENTS OF REGISTER BN
AN - ADDRESS OF REGISTER AN
(AN) - CONTENTS OF REGISTER AN
MN - M'N + (BN)
(AN)' - RESULT OF COMPUTATION

United States Patent Office 3,239,816

Patented Mar. 8, 1966

3,239,816

COMPUTER INDEXING SYSTEM

Mary A. Breslin, Philadelphia, Pa., Mary Louise Moore, Livermore, Calif., and William F. Schmitt, Wayne, Albert Tonik, Philadelphia, and William J. Turanski, deceased, late of Philadelphia, by Margaret K. Turanski, administratrix, Narberth, Pa., assignors to Sperry Rand Corporation, New York, N.Y., a corporation of Delaware Filed July 25, 1960, Ser. No. 45,242
18 Claims. (Cl. 340—172.5)

The present invention relates to an improvement in electronic digital computers having internally stored programs.

One of the recognized advantages of such computers is the ability to perform operations not only upon operands but upon the instructions themselves which control the operations. Thus, in effect, the computer possesses the ability to create new instruction words from existing instructions. Such an ability is important where a computer is required to perform the same sequence of operations many times in succession but employing for each reiteration a different set of operands. There are many problems requiring these particular features. A typical example might be the determination and preparation of a large company payroll. In such a problem it will be evident that a large number of individual employees will have basically similar calculations for arriving at an amount of money to be paid thereto. Thus, each individual will have a certain basic wage rate. In order to arrive at a gross wage for a predetermined period of time it is necessary to multiply the number of hours worked by the aforesaid basic wage rate. Thereafter a number of deductions must be applied in order to arrive at a final sum of money which will represent the actual amount printed on a pay check. Some of these deductions will require further calculations; yet others may be represented by constants. Nevertheless, it will be evident that for each individual pay check basically the same calculations will be required except that for each such calculation a different set of operands must be supplied.

In a general purpose digital computer such as might be used in carrying out the foregoing operation and with which the present invention is used, information stored and manipulated therein may take the form of operand words and instruction words. Each such word is formed from a plurality of digits. The operand words set forth the actual numbers which are added, subtracted, multiplied, shifted or otherwise manipulated in accordance with the instructions supplied and which, in the preceding example, would be used to specify wage rates, hours worked, deductions, etc. Instruction words have certain digits therein preassigned to specify which operation the apparatus is to perform. Other digits found in an instruction word are used to specify storage locations of operand words. Thus, in the foregoing example, it is possible that many different operand words would be involved and correspondingly many different storage locations, whereas the basic operations to be carried out could be specified by the operation digits of a comparatively small number of instructions.

In performing computations using an electronic computer and, in particular, in dealing with a situation where a large number of repetitions of the same basic program are required, it is evident that if separate instructions must be stored within the computer memory for each individual repetition, very rapidly the required memory capacity will become excessive. It is for this purpose that the idea of constructing program loops has arisen whereby the memory of the computer is required to store the necessary instructions once only. Thereafter, by providing certain further instructions, the loop instructions themselves may be altered so that, whereas with a first traversal of the program loop the instructions call for a first set of operands, on succeeding traversals different sets of operands will be called for. Since the instructions themselves need only be written into the memory once, it is evident that either the memory itself may have smaller capacity or that a larger program may be carried in a memory of predetermined capacity.

The present invention concerns an improvement to apparatus and methods used to bring about the operation of a computer employing such program loops as hereinabove discussed. This invention provides apparatus whereby greater ease of programming is secured along with maximum flexibility of operation.

In general, instruction modification may be carried out by causing a computer, upon receipt of a given instruction, to add to or subtract from the operand address, forming a portion of or otherwise associated with the instruction. In either event the address of the operand specified by the instruction is altered by a given amount. Further refinements of this concept of instruction modification may be realized through means which, in turn, may alter this aforesaid given amount. This concept of modifying an address within an instruction by a modifying factor and thereafter changing the modifier itself is known as indexing.

When a program is to be run on a computer and such program contains therein a number of iterative loops (i.e. repetitions of a predetermined set of instructions with changed operands for each repetition) it is necessary to provide means for detecting when the last traversal or iteration of such set of instructions has been completed. In a program containing a loop which is to be repeated many times it is evident that address modifications often have to take place many times and many tests will have to be provided for detecting completion of the loop. Thus, where program loops are used extensively it is possible that more instructions would be used for modification and testing than in the actual calculations upon the operand words.

The computer of the present invention provides a flexible system of storage registers which serve a variety of purposes such as those associated with the usual accumulator registers of a computer. A primary purpose with reference to the present invention is that of indexing.

It is accordingly an object of the present invention to provide a new and improved means for automatically altering instructions in an electronic computer.

A further object of the invention is the provision of means whereby the various instruction modifiers may themselves be modified successively upon provision of appropriate instructions.

Still another object of the invention is the provision of a computer indexing system having a plurality of selfcontained index registers, the contents of which may be selectively and automatically applied to any instruction so requiring.

Yet another object of the invention is the provision of a computer indexing system having index registers containing all of the information required to carry out complete indexing operations upon receipt of appropriate instructions.

A still further object of the invention is the provision of a computer indexing system having index registers a portion of which is adapted to contain the index word to be used as an instruction modifier, a further portion of which is to be used for changing the value of the instruction modifier and another portion of which is to be used as a counter for determining the number of successive program loops which may be carried out.

A still further object of the invention is the provision of an electronic computer provided with a substantial number of different indexing instructions so that flexibility of operation is assured along with transfer of control.

Another object of the invention is the provision of an electronic computer having therein automatic control circuits capable of performing operations on the data contained within any one of a number of index registers and providing for automatic transfer of control if the data so requires.

Other objects and advantages of the present invention will be made apparent as this description proceeds. For a fuller understanding of the invention reference is now made to the drawings attached herewith in which corresponding parts are referenced by the same numerals and of which:

Figure 1:
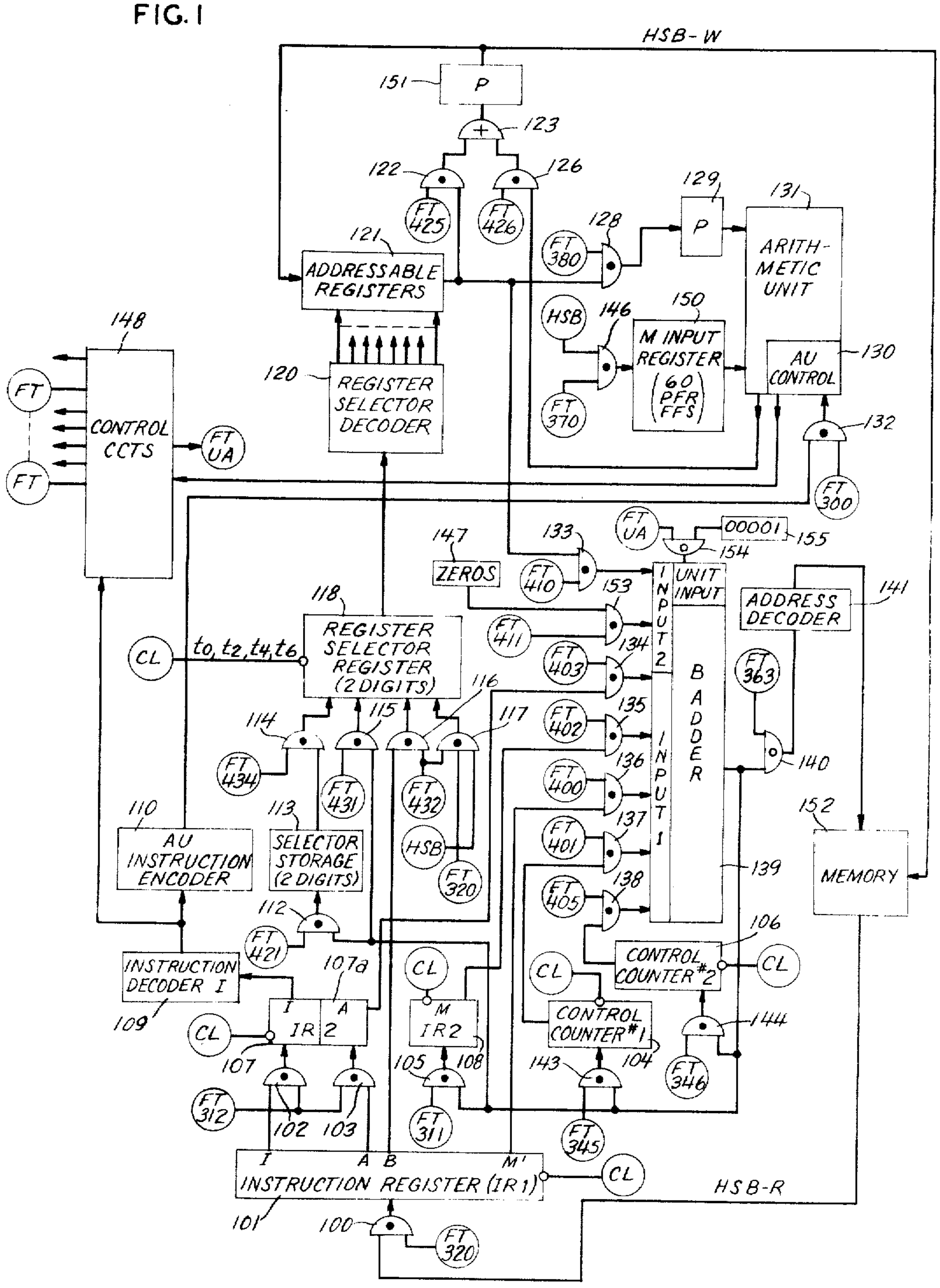
FIGURE 1 is a block diagram representative of a general purpose of a digital computer which embodies the present invention.
Figure 2:
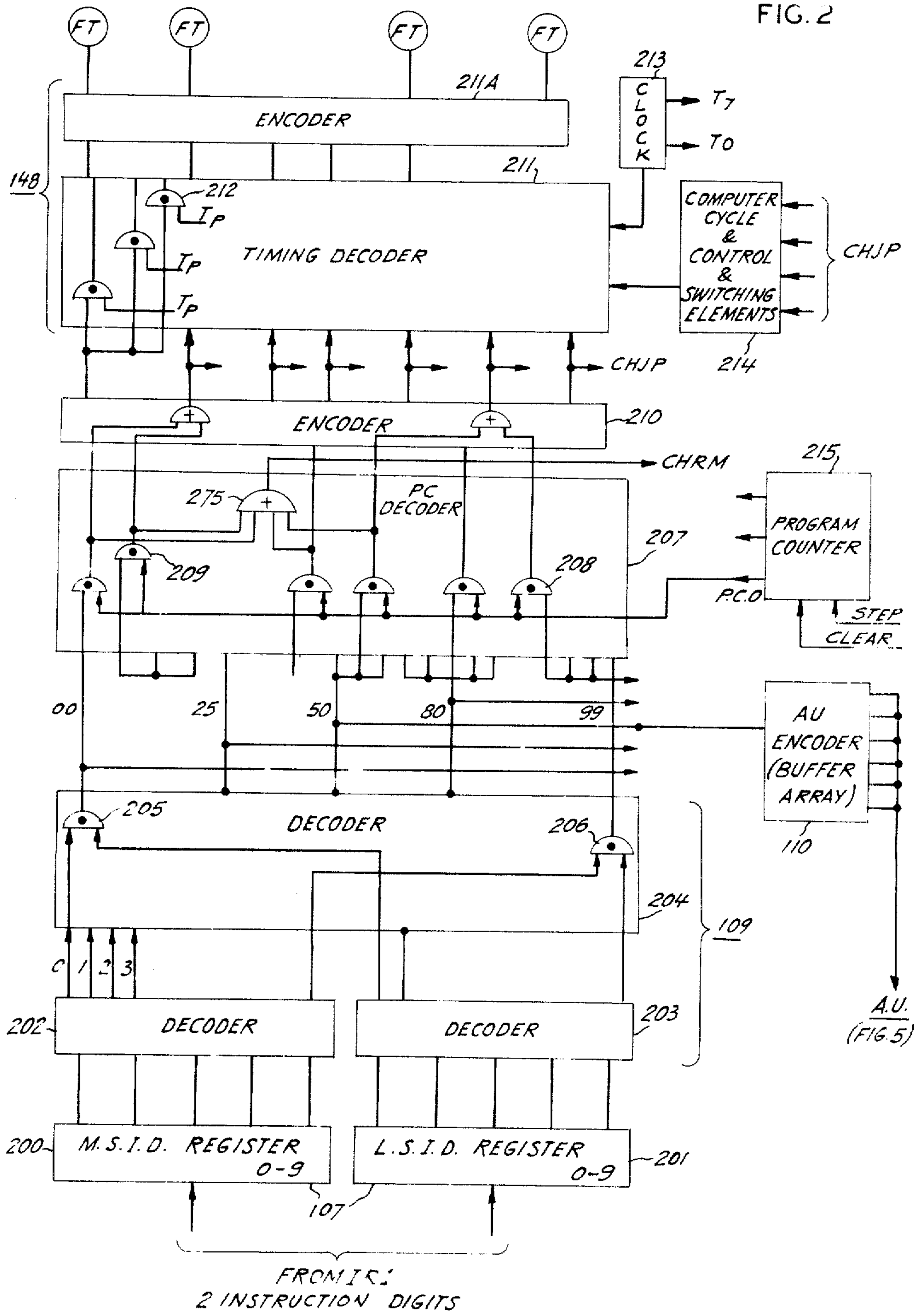
FIGURE 2 is a diagrammatic representation of certain details of the control circuits of FIGURE 1.
Figure 4:
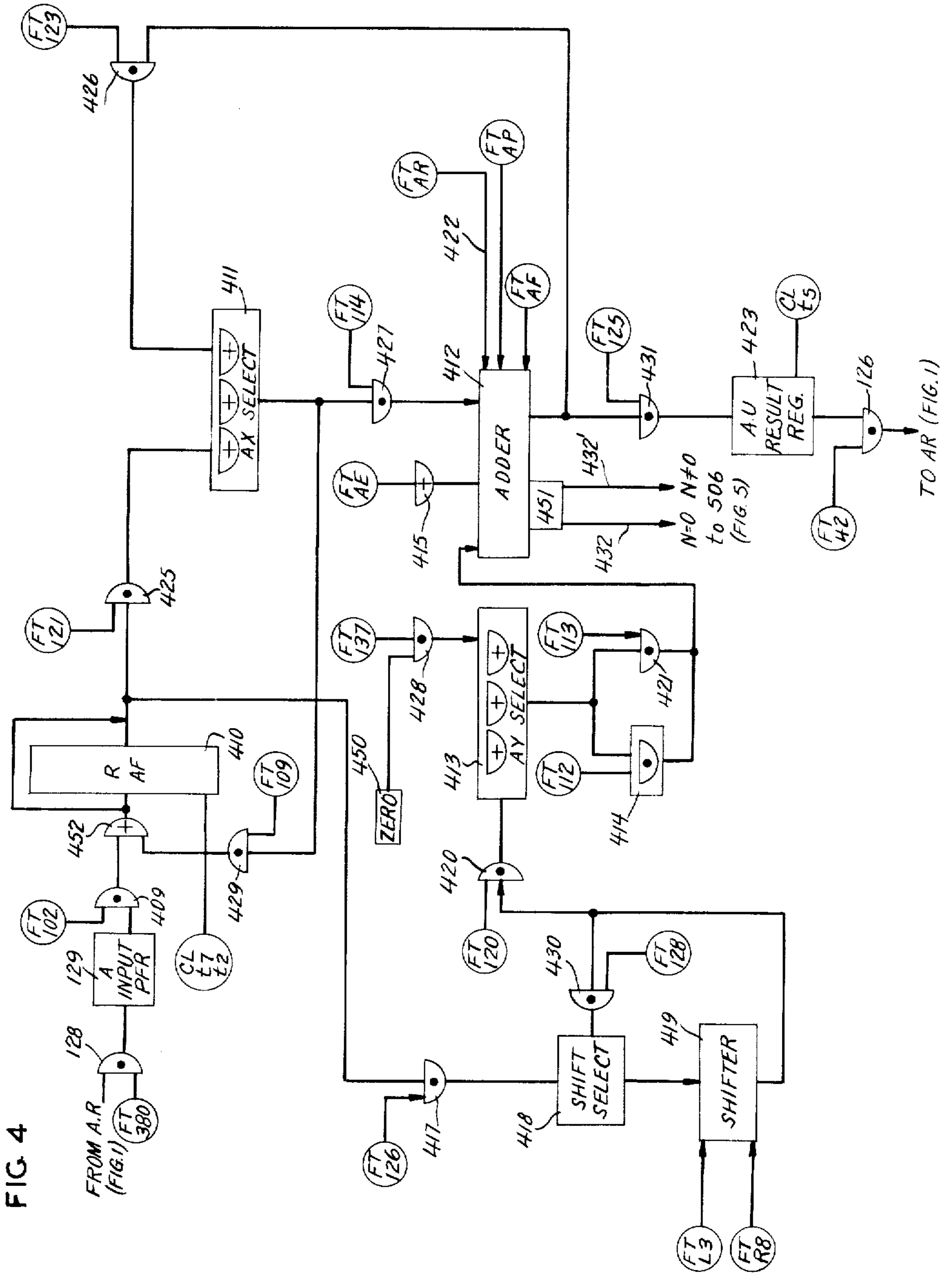
Figure 5:
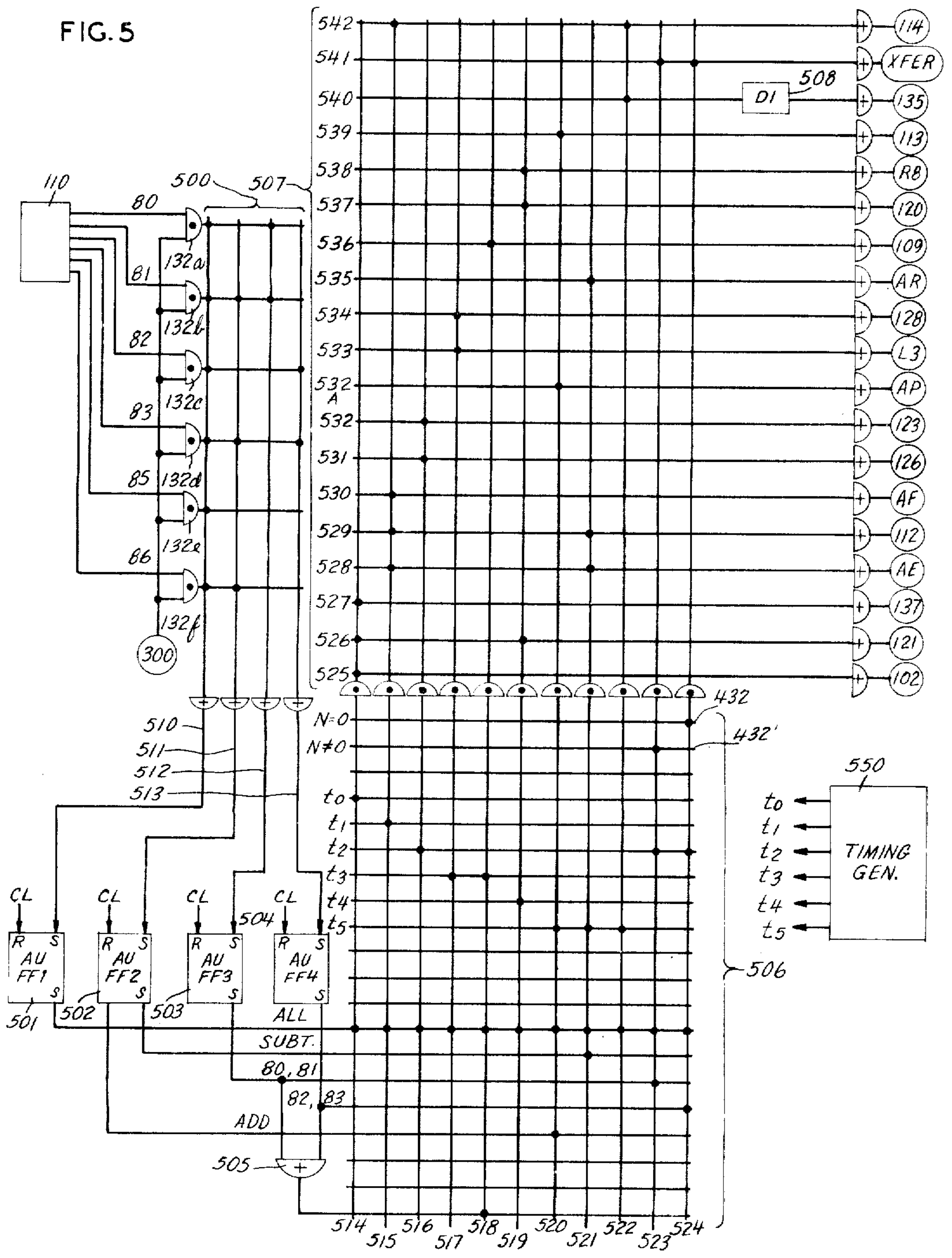
Figure 6:
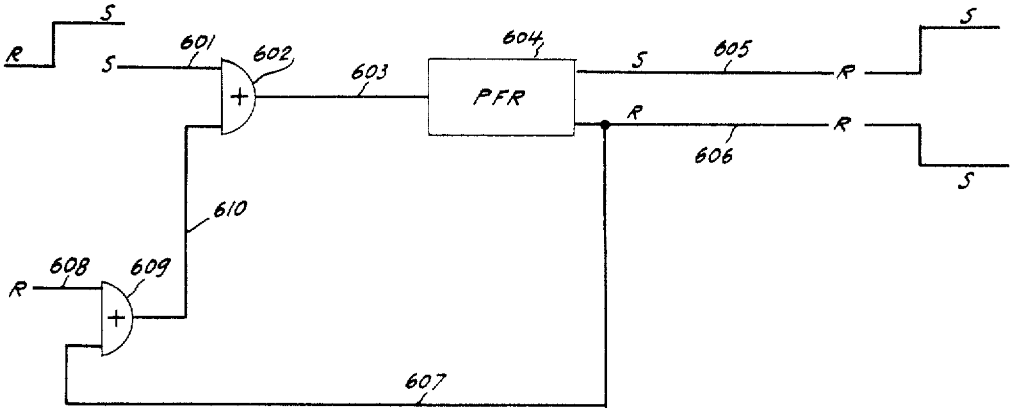
Figure 4A:
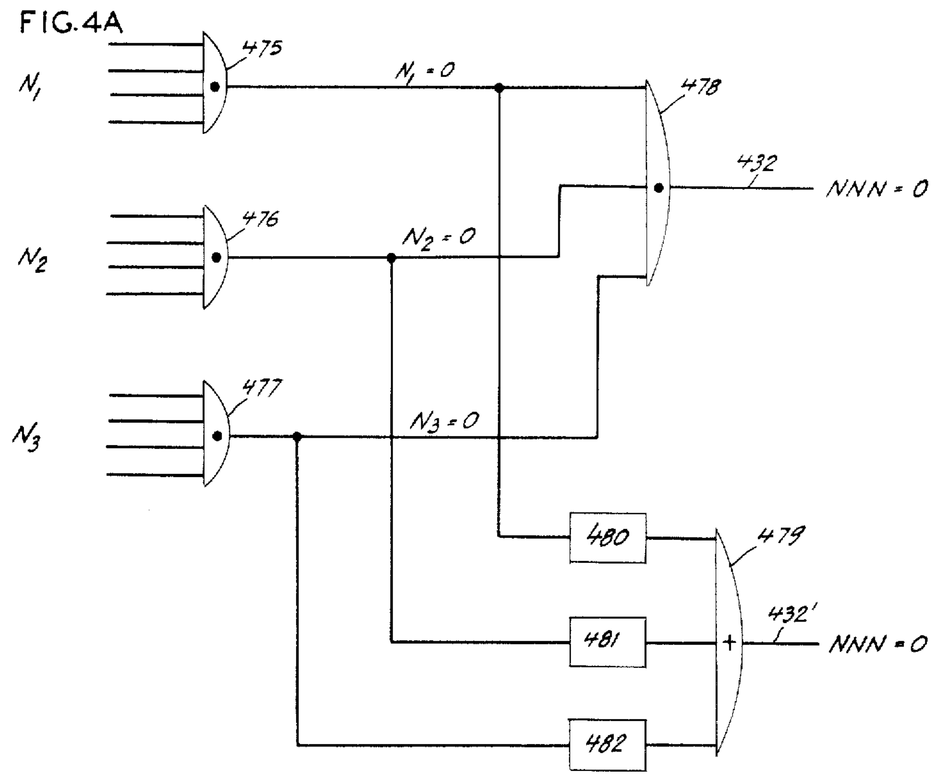
Figure 7:
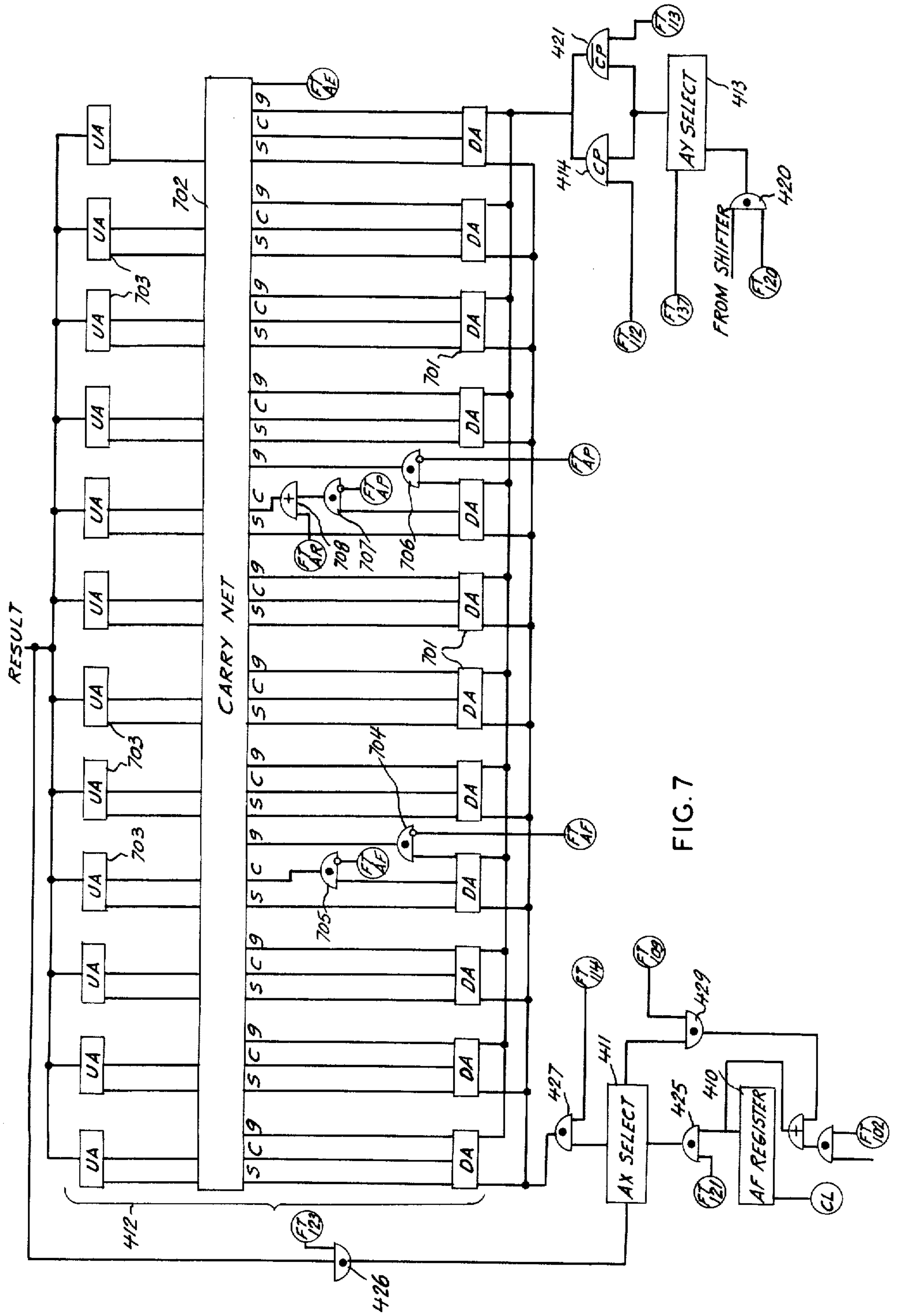
Figure 8:
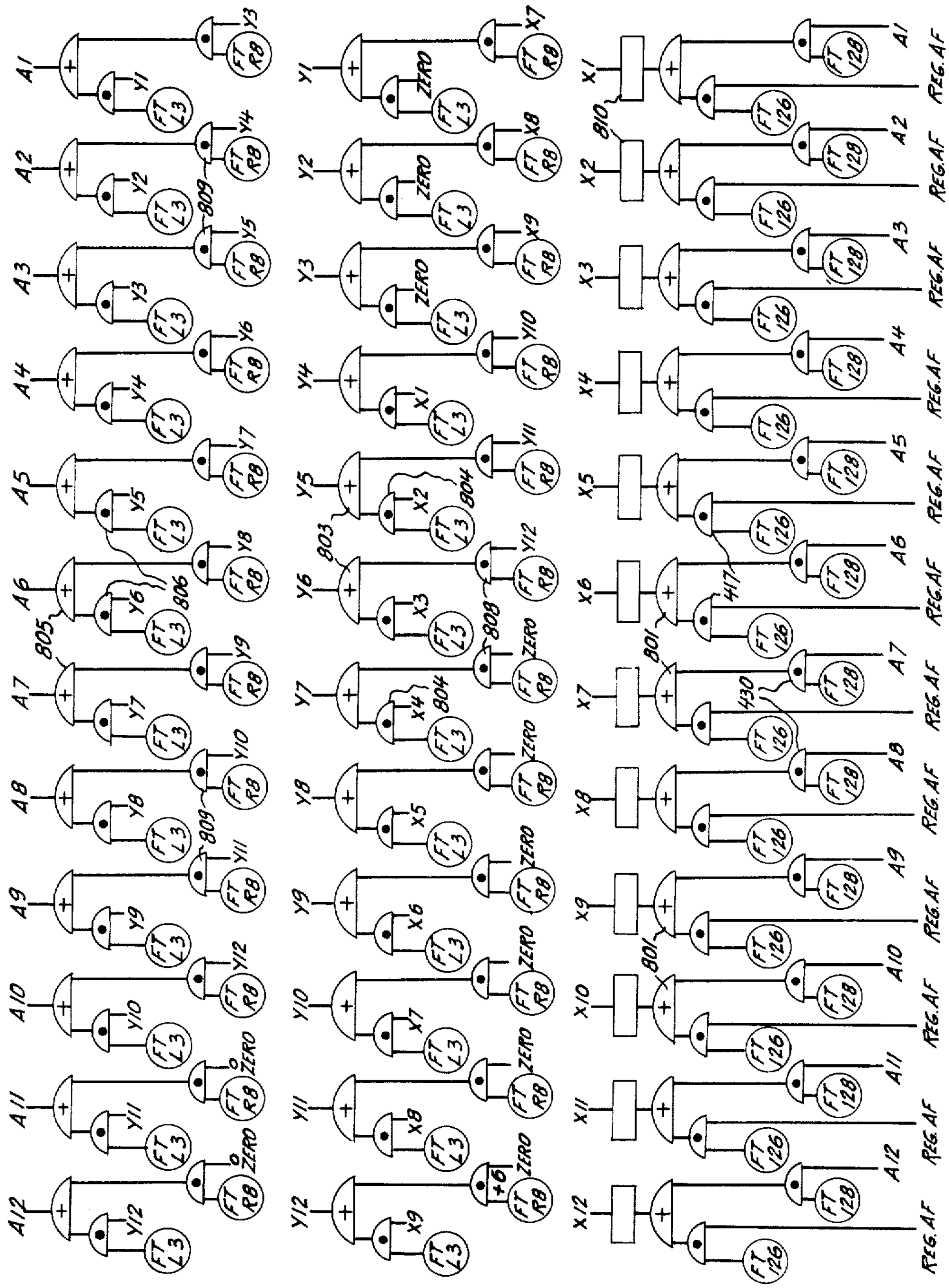
Figure 9:
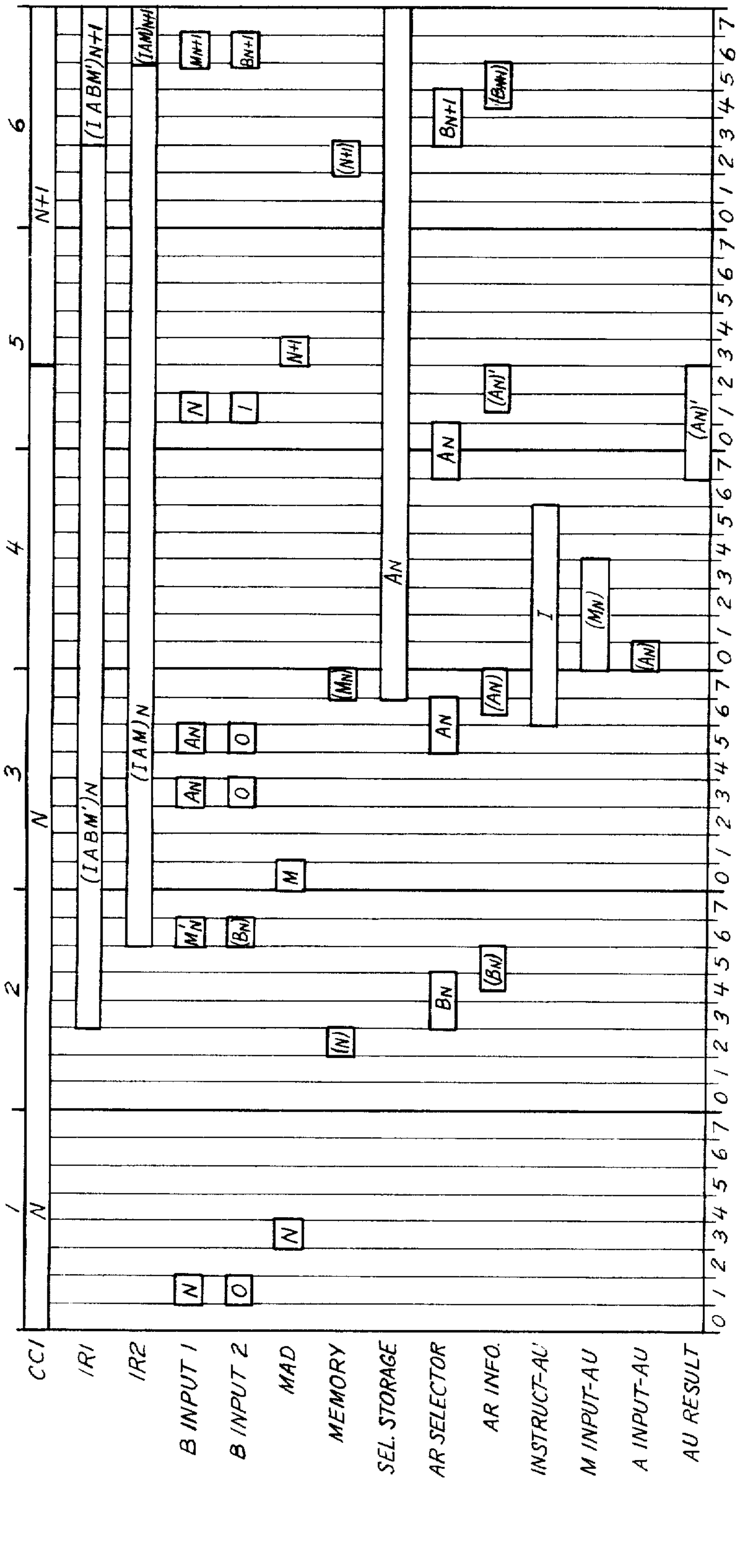
Figure 10:
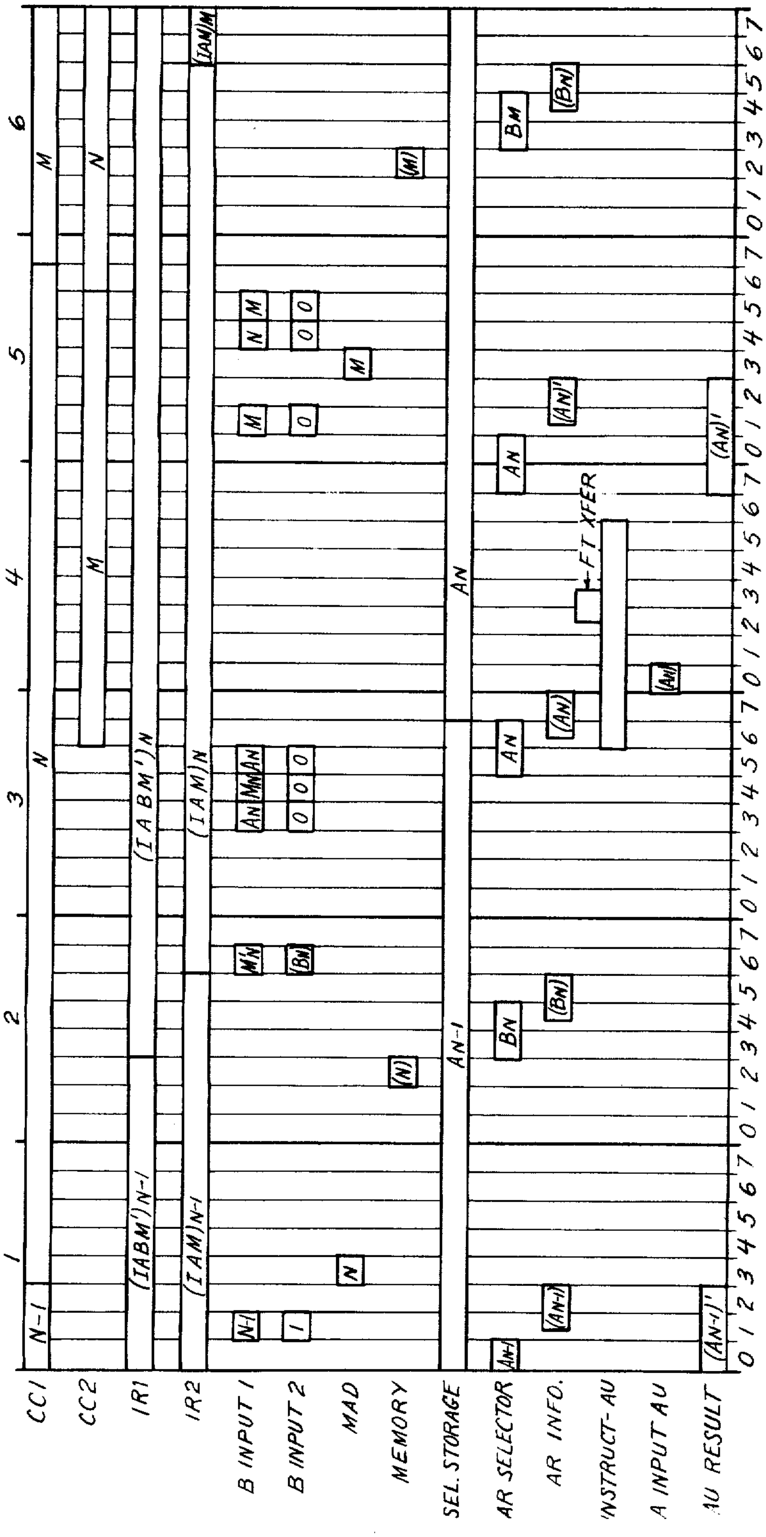
Figure 11:
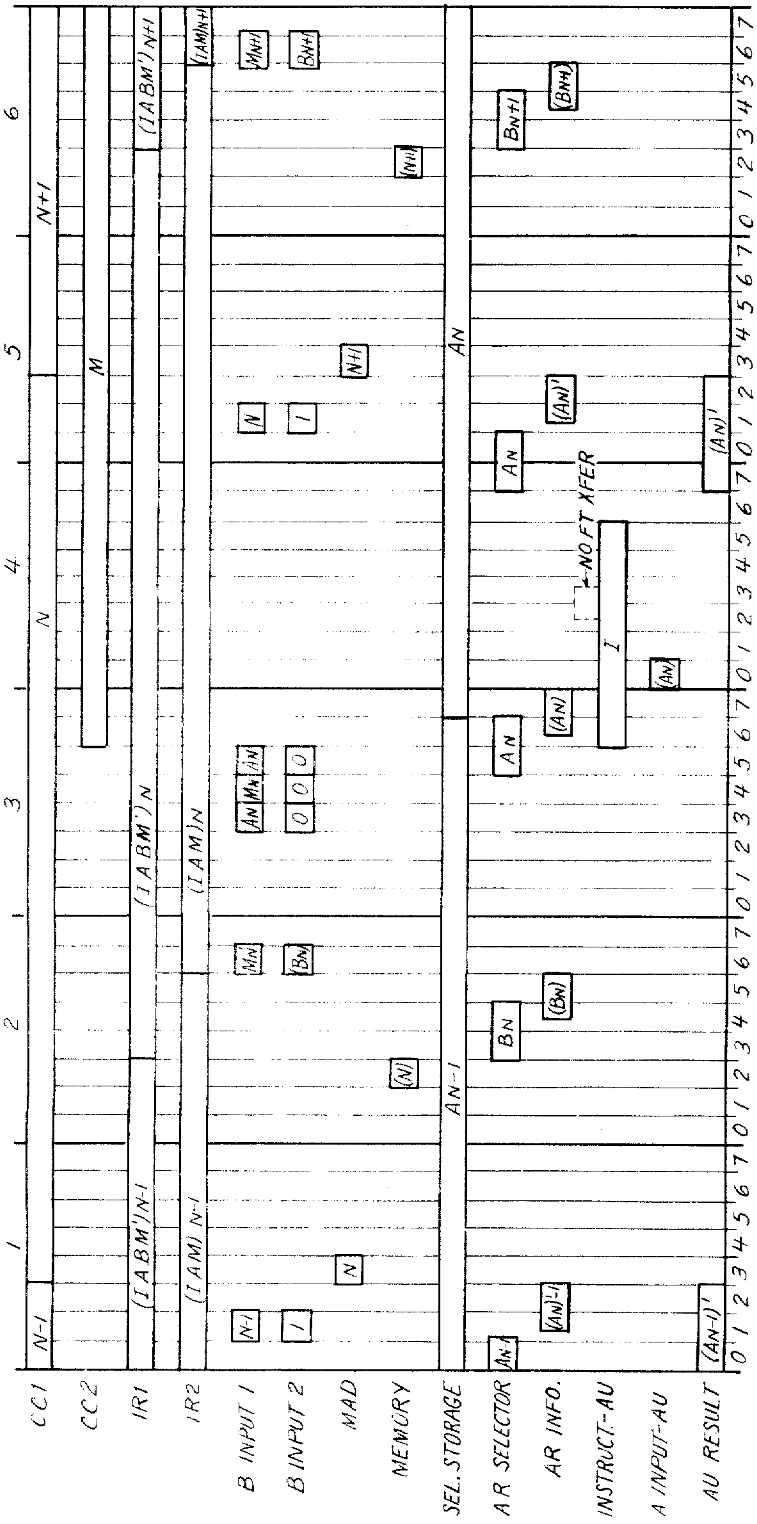

FIGURES 3, 3*a*, 3*b*, 3*c* and 3*d*, when assembled, are a diagrammatic representation of the details of certain portions of FIGURE 2 and specifically show means for generating function signals as required for the operation of the overall circuit of FIGURE 1;

FIGURE 4 is a general block diagram of the arithmetic unit of FIGURE 1 and the circuits therein which are utilized to carry out indexing instructions as are discussed hereinafter;

FIGURE 4*a* is a detailed representation of a portion of FIGURE 4 and shows a method for detecting zeros in a portion of the operand word being manipulated;

FIGURE 5 is a detailed diagrammatic representation of the control circuits required to generate the necessary function table signals for the arithmetic unit of FIGURE 4;

FIGURE 6 is a diagrammatic representation of a flip-flop of the type used in the present invention wherein a set signal always takes precedence over a reset signal;

FIGURE 7 is a diagrammatic representation of further details of the adder found in the arithmetic unit of FIGURE 4;

FIGURE 8 is a detailed diagrammatic representation of the shifter of FIGURE 4;

FIGURE 9 is a general timing diagram indicating the progressive sequence of events occurring in FIGURE 1 during an add instruction;

FIGURE 10 is a timing diagram showing the sequence of events when an indexing instruction is received and wherein a transfer of control takes place; and FIGURE 11 is a timing diagram showing the sequence of events when an indexing instruction is received and wherein no transfer of control takes place.

This invention as described is embodied in a large-scale high-speed digital computer. Applications of the invention to other and smaller computers involving different systems and components are within the scope of the invention as will be apparent from the following description.

Before considering the details of FIGURE 1 it may be of assistance in grasping the concepts to be set forth to consider, in general terms, the organization of a stored program digital computer. In such a computer both instructions and operands are stored in a memory. In FIGURE 1 the memory appears as block 152. Each word stored in the memory has associated therewith a unique address whereby it is possible to send signals corresponding to such an address to the memory and either place information therein or extract information therefrom either in the form of operands or instructions. An appropriate form of memory would be a random access coincident-current magnetic core memory such as that described in U.S. Patent No. 2,931,016.

Another segment of a computer is an arithmetic unit which appears on FIGURE 1 as block 131 and is shown as connected to the memory as well as to the other blocks. The arithmetic unit, upon receiving instructions, will carry out computations involving operands stored in the memory and in another store, the registers 121.

The control circuits generally comprise registers operating in conjunction with timing circuits, decoding circuits and encoding circuits so that instructions when received may produce all of the various control signals required at various times to enable the progression of information through the various circuits. On FIGURE 1, the control circuits involve general block 148 the further details of which are found in FIGURES 2 and 3; the instruction registers IR–1 101, IR–2 **107–107*a*, 108, decoder 109, encoder 110 and the arithmetic unit control 130**. All of these units are involved in translating an instruction into the control signals required for its execution.

In order that a regular progression of instructions may be extracted from the memory and supplied to the computer, control counters 104 and 106 (FIG. 1) are provided. These elements, since they control the sequencing of instructions, are also involved during a transfer of control from one sequence of instructions to another sequence.

Consider now the block diagram of FIGURE 1. In FIGURE 1, coincident ("and") gates are indicated throughout by a half moon configuration with a dot in the center thereof. Where buffers ("or" gates) are required they are similarly indicated by a half moon but in such case a plus sign is found in the center thereof. The computer operates in the parallel mode, that is to say, electrical signals representative of an entire computer word are simultaneously transmitted through the various elements. This is by way of contrast with a serially operated computer in which individual binary digits forming words are transmitted serially in time through the various machine elements. Since, as mentioned, the present machine operates in parallel in many instances single lines actually appearing in the various figures are actually representative of many lines. The length of the word transmitted in parallel is 12 decimal digits, of which the most significant may be a sign digit. Each digit in turn is represented by five bits. The coding may be any one of a well known number of codes such as the 8–4–2–1 or 5–4–2–1 (biquinary) codes. The fifth bit is used for checking purposes. The entire word therefore is represented by sixty bits. Thus gate 100 connecting the memory to instruction register 101 actually comprises sixty gates. Similarly, gates 102 and 103 connecting IR–1 and IR–2 actually represent ten gates for transmitting two decimal digits (10 bits) each and gate 105 represents twenty-five gates for transmitting five decimal digits (25 bits). Other variations are transmission of one decimal digit (5 bits) and transmission of control signals via a single control line. The number of signal lines represented by a single illustrated line and the number of gates represented by a single illustrated gate will be apparent from the following description in each instance.

Control counter–1 (104) has the output thereof connected via gate 137 to input 1 of the B adder 139. The B adder 139 is used in conjunction with the aforesaid control counter–1 to step progressively the contents of the control counter whereby a regular succession of numbers representing the addresses of a succession of instructions is indicated by such control counter. The output of B-adder 139 is connected back to the input of control counter–1 (104) via gate 143; thereby a number in control counter–1 (104) is applied to the B-adder 139, augmented by unity, and restored in control counter–1. Appropriate function signals (represented in circles by the prefix FT) for providing permissive signals to the various gates involved are developed in accordanace with the details of FIGURE 3 and will be discussed hereinafter.

The output of the B adder 139 is also connected by way of gate 140 to the address decoder 141, the output of which is in turn connected to the memory 152. Thus, addressing the memory is done from control counter–1 (104) by way of the B-adder 139 and the address decoder 141 so that a series of instructions may be called out of the memory.

The memory 152 in practice may be divided into ten cabinets each of which is individually addressed. The 5-digit memory address MMMMM is interpreted by the address decoder 141 in a manner suitable for addressing the memory 152. For example, the two least significant decimal-digits may be used for the X-select, the next 2 decimal-digits for Y-select, and the most significant decimal-digit for cabinet select. The one decimal digit for selecting the memory cabinets determines to which of the ten cabinets the X and Y digits are applied. The X and Y digits are used in a coordinate selection system of a conventional type for a coincident-current magnetic memory. The two X-digits may assume the values of 00–99, as may the Y digits, which provide a total of 10,000 possible coordinate positions within each cabinet. Each selected memory location provides space for 60 bits of storage for a complete word; these 60 bits, as is customary, are made available at corresponding points of 60 parallel memory planes, the corresponding points of which are all selected by a single set of X and Y digits. The driving of the memory by X and Y digit signals performs a read out from the selected memory onto the HSB–R in the form of 60 bits in parallel. To write in the memory, the information is supplied on the HSB–W at the same time X and Y digit signals are supplied.

The output of memory 152 is shown connected to the input of the first instruction register IR–1 101 by way of the Read high speed bus, HSB–R, and gate 100. Thus, an instruction as called for from the control counter 104 may be transmitted from the memory to IR–1. Control counter–2 (106) may also address the memory by way of gate 138, input 1 to the B-adder 139, gate 140 and address decoder 141. Control counter–2 (106) is used to address the memory during the transfer of control operation.

Certain portions of an instruction word coming from the memory may also be transmitted directly from HSB–R to register selector register 118 by way of gate 117 when appropriate function table signals are received from the control unit. From IR–1 (101) various portions of an instruction received therein are transmitted to further elements. Thus, the portion of the instruction word indicated as I is transmitted to section 107 of IR–2 (instruction register–2) by way of gate 102. The portion of the instruction word designated A is transmitted to section 107A of IR–2 via gate 103. The portion designated B is transmitted to register selector register 118 by way of gate 116. Finally, the portion designated as M′ is sent to the input 1 of the B-adder 139 by way of gate 136. Thus, IR–1 (101) is connected to IR–2 (107, 107A), register selector register 118 and B-adder 139.

The output of section 107 of IR–2 is connected to instruction decoder 109 and the output of instruction decoder 109 is in turn connected to AU instruction encoder 110 as well as control circuits 148. The output of AU instruction encoder 110 is connected to the AU control 130 by way of gate 132. Also connected into control circuits 148 are signals originating from AU control 130.

The B-adder 139 is provided with three inputs indicated respectively as input–1, input–2 and unit input. To input–1 are connected gates 134, 135, 136, 137 and 138. Gates 137 and 138 are associated respectively with control counters 104 and 106 as hereinbefore described. Gate 136 is connected to IR–1 (101) also as previously described. Gate 135 is connected to section 108 of IR–2 whereby the output of IR–2 may be transmitted through the B-adder when required. Gate 134 is connected to the output of section 107A of IR–2 whereby the contents of this section may likewise be transmitted through the B-adder. Input–2 of the B-adder has two input lines associated therewith by way of gates 133 and 153 respectively. Gate 153 has its input connected to zero register 147 which is effective to supply signals corresponding to coded zeros. Thus, when the appropriate function table signal is received on gate 153 a coded zero is transmitted to input–2 of the B-adder 139. The input to gate 133 is connected to the output of addressable registers 121 so that when the appropriate function table signal is received a portion of the contents of the designated addressable register is transmitted to input–2 of the B-adder 139.

The third input of the B-adder is indicated as unit input and at appropriate times when the unit Add (UA) function table signal is applied to gate 154 a coded one (00001) from register 155 is passed into this section of the B-adder 139.

The output of the B-adder 139 in addition to being connected to the address decoder 141 and control counters 104 and 106 is connected via gate 105 to the input of section 108 of IR–2. Further the output of the B-adder 139 is connected by way of gate 112 to the input of selector storage 113 and by way of gate 115 to the input of register selector register 118. The output of selector storage 113 is connected to the input of register selector register 118 via gate 114. The output of register selector register 118 is connected to the input of register selector decoder 120 and the output of the register selector decoder 120 is connected to the addressable registers 121 whereby a desired addressable register may be specifically selected.

The addressable registers 121 are of the recirculating type so that when information is read from a selected addressable register it is necessary to restore such information by recirculation. For this purpose a recirculation path is shown which includes a gate 122, a buffer 123 and a pulse former 151 connected serially between the output of the block of addressable registers 121 and the input thereof. In order to place results of computations into a selected addressable register an output line from the arithmetic unit 131 is connected into the recirculation path by way of gate 126. From here the information may pass by way of buffer 123 and pulse formers 151 into the selected addressable register in the block 121.

Two informational inputs feed the arithmetic unit 131. One of these originates from the addressable register block 121 and includes gate 128 and pulse formers 129. The other such informational input includes M input register 150 and gate 146 which latter gate is connected to receive information from the memory 152 via HSB–R. The output of the addressable registers 121 may also be passed to the Write high speed bus, HSB–W, and into memory 152 by way of the portion of the recirculation path involving the gate 122, buffer 123, and pulse formers 151.

Before discussing in detail the operation of the computer on an ordinary instruction and indicating the function performed by the various elements as described hereinabove, the form of an instruction will now be set forth. Both operand words and instruction words have a twelve decimal digit format (5 bits per digit, to form a 60-bit word). In the case of operand words the most significant digit position is reserved for a sign; however, in the case of an instruction word the aforesaid most significant digit position has no use with reference to the present invention and accordingly will not be discussed further. The instruction word therefore has the following format:

II AA BB MMMMM

Herein the I digits specify the operation to be performed by the computer such as add, subtract, multiply, shift, etc. Since the computer operates in a binary coded decimal mode it is evident that up to one hundred different commands may be provided by the aforesaid I digits.

The A digits refer to the address of an addressable register. Such digits are used to specify a register from the block 121 in FIGURE 1 from which it is desired to extract an operand to be operated on or to specify which such addressable register is to be used to store a result coming from the arithmetic unit 131. Since there are two A digits it is evident that one hundred addressable registers may be provided.

The B digits likwise specify an address of one of the addressable registers 121. When through the use of the B digits an addressable register is selected a different operation is performed than in the case where said register is selected by the A digits. In the case of addressing a register by B digits a portion of the contents of such register are used to modify the M digits of that instruction which contained the aforesaid B digits.

The M digits of the instruction refer to the address in the memory of either an operand or an instruction. These digits therefore may be altered by the addition thereto or the subtraction therefrom of the aforesaid partial contents of an addressable register as selected by the B digits of the same instruction.

The computer of the invention has been designed to operate on a cycle of eight pulses. That is to say eight pulse times are required to address the memory and extract a word therefrom. These pulses are numbered from 0 to 7 and one such group of pulses is referred to as a minor cycle. In carrying out instructions on this machine, basic instructions and those instructions with which the present invention is more particularly concerned require four minor cycles from the time they are called for until such time as they have been executed and the results therefrom stored.

Consider now the operation of the various components of FIGURE 1 when the machine is required to execute a basic instruction such as, for example, an addition. For this purpose reference is made to FIGURE 1 in conjunction with FIGURE 9 which latter figure shows the basic sequence of events in the progression of instructions and information throughout the various components.

When the machine is initially started, as will be made manifest in subsequent discussions of FIGURES 2 and 3, the first instruction will be called for. Such call for an instruction is made by furnishing function table signals FT401 and FT411 to gates 137 and 153 respectively at $t_0$ of the first minor cycle, whereby the contents of control counter 1 (104) are read into input–1 of B-adder 139 while zeros are read into input–2 of the aforesaid B-adder. This call from the control counter 104 is established in the B-adder inputs at $t_1$ of the first minor cycle. The B-adder 139 operates with two pulse times elapse between the input of information thereto and the obtaining of a result therefrom. The original contents of the control counter 104 appear at the output of the B-adder unchanged inasmuch as zeros have been added thereto. At time $t_2$ of the first minor cycle the function table signal FT363 is placed on gate 140 whereby the B-adder output is passed through to be established in address decoder 141 at $t_3$, decoded therein and subsequently passed to the memory thereby to specify the memory location from which the first instruction is to be extracted.

The contents (N) of the selected memory location N are available at $t_2$ of the second minor cycle and appear on the Read High Speed Bus line HSB–R leading from the memory 152 to gate 100. A function table signal FT320 applied to gate 100 enables the N instruction word to be read into IR–1 (101). It will be noted that the same function table signal FT320 appears on gate 117 and with the appearance, in addition, of the function table signal FT432 the B digits of the instruction are read directly from the high speed bus HSB–R from the memory 152 directly into the addressable register selector register 118. On FIGURE 9 it will be noted that during times $t_3$ and $t_4$ the B digits of the instruction word are stored in the register selector register 118 from where they are decoded in register selector decoder 120 thereby to select one of the addressable registers 121 the contents of which are required for the next step in the cycle.

Between times $t_4$ and $t_5$ of the second minor cycle the contents of the addressable register selected by the aforesaid B digits are available and at $t_5$ function table signal FT410 is applied to gate 133, whereby the portion comprising the five least significant digits of the selected addressable register are established at $t_6$ in input–2 of the B-adder 139. Also at $t_5$ funtcion table signal FT400 is applied to gate 136 thereby allowing the M digits contained in IR–1 (101) and presently expressed as M′ to be applied to input–1 of the B-adder 139. Also occurring at this time is the function table signal FT312 which enables the I and A instruction digits stored in IR–1 to be passed via gates 102 and 103 respectively into sections 107 and 107A of IR–2 respectively.

During $t_7$ of the second minor cycle the M digits as now altered by the addition thereto of the contents of the selected addressable register as hereinbefore noted are available at the output of B-adder 139 and again function table signal FT363 is applied to gate 140 whence the altered digits are established at the next $t_0$ in decoder 141 to address the memory 152 for the selection therefrom of an operand. Also at $t_7$ function table signal FT311 will be applied to gate 105 whereby the same M digits are read into section 108 of IR–2.

The situation now existing within the computer is thus: The instruction digits II are in section 107 of IR–2 from which they may be decoded by instruction decoder 109 and sent to the control circuits 148 therein to develop further function table signals as required; the A digits are in section 107A of IR–2; and the modified M digits, which specify an operand address, have been sent to the memory to call for that operand and also have been stored in section 108 of IR–2.

Referring again to FIGURE 9 it will be noted that at $t_3$ of the third minor cycle the A digits of the instruction are established in input–1 of B-adder 139 while zeros are established in input–2 of the aforesaid B-adder, by means of the gating action at $t_2$ of FT403 and FT411. The output of the B-adder is thereafter gated through gate 115 into register selector register 118 by the application of function signal FT431. It will be seen from the timing diagram that the A digits are held in register selector register 118 during pulse times $t_5$ and $t_6$ of the third minor cycle. It will be observed from FIGURE 1 with reference to register selector register 118 that clearing pulses are supplied thereto at pulse times $t_0$, $t_2$, $t_4$, and $t_6$, whereby such register will be cleared at $t_1$, $t_3$, $t_5$ and $t_7$. From register selector register 118 the A digits stored therein are decoded in register selector decoder 120 and the addressable register selected thereby is read out between times $t_6$ and $t_7$ of the third minor cycle. The contents of this A register are an operand supplied to the AU 131 together with the operand called for from the memory 152.

At $t_5$ of the third minor cycle the function table signal FT300 is produced by the control circuits and the effect of this is to permit gate 132 to pass into the arithmetic unit control 130 signals corresponding to the I digits as encoded by instruction encoder 110. It will be noted from the timing diagram that the encoded instruction signals remain established in the AU control 130 during an entire minor cycle of time from $t_6$ of the third cycle.

During $t_4$ of the third minor cycle, signals FT403 and FT411 are once again applied to the gates 134 and 153 at the inputs–1 and 2 respectively of B-adder 139. This again establishes the A digit contents of section 107A of IR–2 in B-adder 139 along with zeros at $t_5$. For subsequently addressing that one of the addressable registers 121 wherein the result is to be placed, storage of these A digits is in selector storage 113 at $t_7$, coming from the B-adder output via gate 112 with the application at $t_6$ of a function table signal FT421 thereto. From FIGURE 9 it will be seen that selector storage 113 receives the A digits at $t_7$ of the third minor cycle.

At $t_0$ of the fourth minor cycle both of the operand words are passed into the arithmetic unit 131. From memory 152 the selected operand word is taken by way of the high speed bus and passed through gate 146 into M input register 150. Function table signal FT370 is developed at time $t_7$ of the third minor cycle. At the same time function table signal 380 is developed which simultaneously permits gate 128 to pass the other operand word from the selected addressable register through pulse formers 129 into the arithmetic unit 131.

One minor cycle is required for execution of the basic add instruction. Also one minor cycle is required for execution of the indexing instructions with which the present invention is immediately concerned. During time $t_7$ of the fourth minor cycle the result of the computation will become available in the arithmetic unit result register 423 which may be noted on FIGURE 4. The result from the arithmetic unit is thereafter transmitted by way of gate 126 and buffer 123 into the recirculation path of addressable registers 121. Gate 126 receives a function table signal FT426 at $t_1$ of the fifth minor cycle. However, during $t_6$ of the fourth minor cycle the function table signal FT434 has been applied to gate 114 and this enables the contents of selector storage 113 to be set up in register selector register 118 at $t_7$ and to be held there as in previous instances for two pulse times. Again a register is selected by register selector decoder 120, in the present case the same register, so that between times $t_1$ and $t_2$ of the fifth minor cycle the result of the computation may be passed back into the selected one of the addressable registers.

While the result is being obtained from the arithmetic unit 131 and stored in a selected addressable register further function signals are developed to enable the selection and execution of the ensuing instructions. Thus, at $t_0$ of the fifth minor cycle function table signals FT401 and FTUA are applied respectively to inputs–1 and 2 and the carry input of B-adder 139. These enable the gate 137 to pass the contents of control counter 104 to the B-adder 139 where they are increased by one. At $t_2$ of the fifth minor cycle when the results of the addition in the B-adder 139 are available function table signal FT363 is again applied to gate 140 whereby the next succeeding instruction in the regular sequence is called for by way of address decoder 141. Subsequently thereafter the same sequence of events takes place as in the foregoing. Thus, at time $t_2$ of the sixth minor cycle the $(N+1)$th instruction is available on the high speed bus and is gated into IR–1 by the application of a function table signal FT320 to gate 100.

In connection with IR–1, IR–2 and the two control counters 104 and 106, respectively, it will be observed that clear signals are furnished therefor. Such clear signals may in fact be furnished by the same function signals which enable the passage of new information into the respective elements. The structure of these storage devices enabling such clearing operation to be performed will be discussed hereinafter in particular in connection with FIGURE 6.

Basic instructions such as the add instruction just described may be successively extracted from the memory and executed in accordance with the sequence of events as set forth hereinabove and in particular with reference to the timing diagram of FIGURE 9. When the index instructions of the present invention are considered, however, certain changes occur in timing which will be set forth subsequently. The addressable registers may be filled by a simple fetch instruction which is similar to the add instruction in operation and sequencing except that no arithmetic operation is performed on the fetched operand.

*Derivation of function table and other control signals*

Figure 3A:
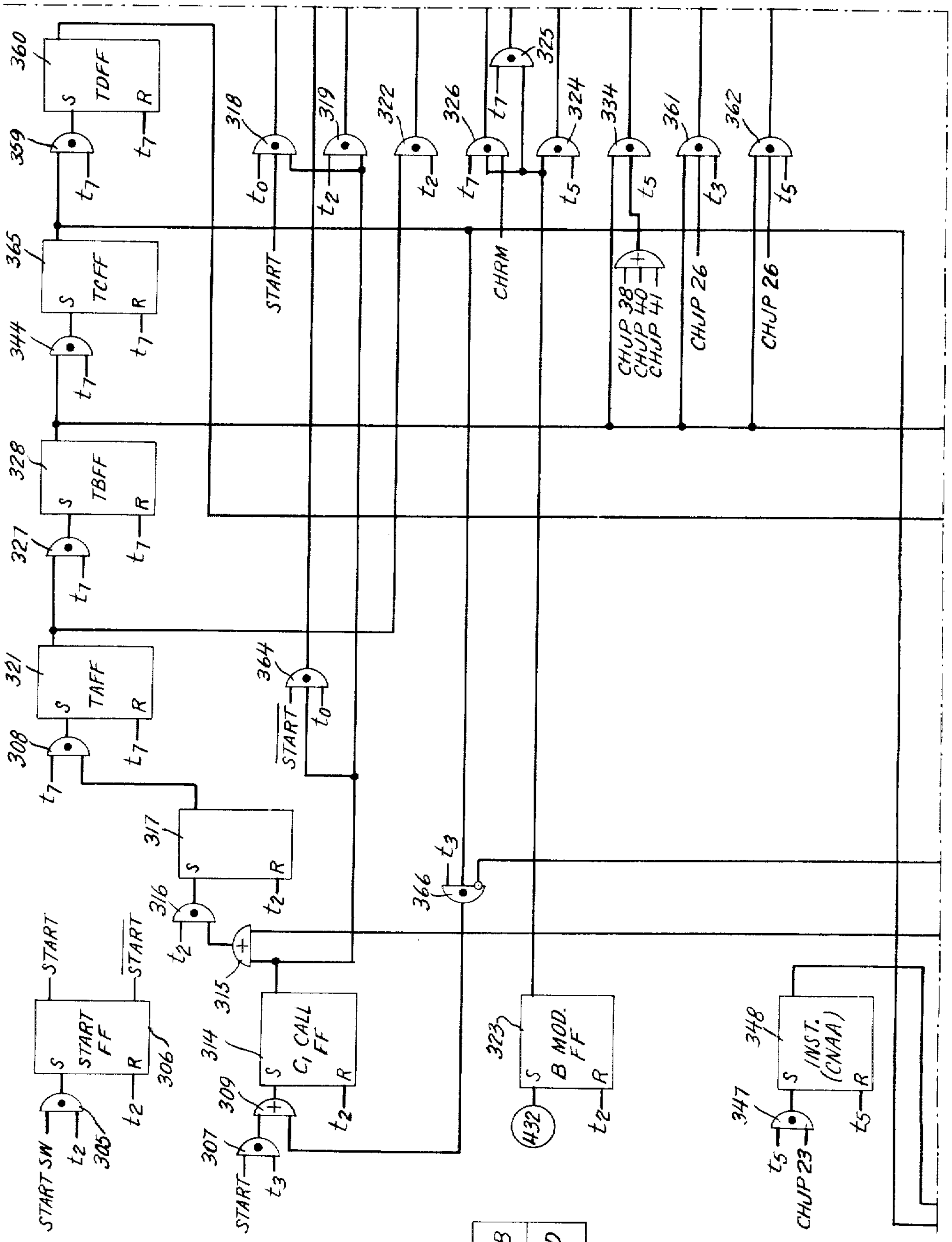
Figure 3:
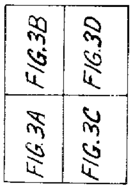

To describe the derivation of function table and other control signals, reference is made to FIGURES 2 and 3. FIGURE 2 provides further details of the control circuits 148 found on FIGURE 1 and the equipment related thereto.

From the discussion of FIGURE 1 it will be recalled that section 107 of IR–2 which stores the I digits of an instruction has its output connected to the instruction decoder 109. On FIGURE 2, section 107 of IR–2 is shown as comprising two sections, viz., a most-significant-instruction-digit register 200 and a least-significant-instruction-digit register 201. Each of registers 200 and 201 comprises five bistable storage elements (such as the well known flip-flop) each having two outputs. The five bistable elements in each of registers 200 and 201 are effective to store five binary digits which form one of the two decimal I digits.

Instruction decoder 109 in FIGURE 1 is shown on FIGURE 2 as comprising two stages and the first such stage comprises decoders 202 and 203 and these correspond respectively to registers 200 and 201 the outputs of which are connected to their respective decoders. The decoders 202 and 203 each comprise a plurality of gates. Upon receiving an input from their respective registers 200 and 201 a single one of ten output lines corresponding to the decimal values 0 through 9 will receive an output signal therefrom indicative of the decimal value stored in their corresponding registers.

The ten output lines from decoder 202 and the ten output lines from decoder 203 are connected into the second stage of instruction decoder 109 and this on FIGURE 2 is indicated by reference numeral 204. As in the case of the individual bit decoders 202 and 203, decoder 204 comprises a plurality of coincidence gates, for example, gates 205 and 206. Each output line from decoder 202 and decoder 203 drives ten such gates so that decoder 204 comprises one hundred gates and has coming therefrom one hundred output lines indicated on FIGURE 2 as lines 00–99. Thus, line 00 is the output line of gate 205 in decoder 204. The inputs to this gate 205 are derived from the lines representing decimal digit 0 from decoders 202 and 203. Line 99 is the output of gate 206 receiving the decimal digit 9 lines. The output lines 01 to 98, while not specifically shown, are similarly derived from separate gates. Thus, output line 25 would be the output line of a gate (not shown) in decoder 204 the inputs of which will be taken from the lines representing decimal two output from decoder 202 and decimal five output from decoder 203 respectively.

The one hundred output lines on stage 204 of the decoder 109 are connected to the arithmetic unit encoder 110 also shown in FIGURE 1. The encoder array 110 comprises a plurality of "or" gates so that, in response to an input from one of the one hundred output lines of decoder section 204, a plurality of output lines from encoder 110 will receive signals thereon. The outputs from instruction encoder 110 are connected to the AU control 130 as shown in FIGURE 1 by way of gates 132. Further details of the AU control circuits 130 as they effect operations within the arithmetic unit will be discussed in connection with FIGURE 5.

The output lines 00–99 from section 204 of the decoder also drive the program counter decoder 207 which is a gating matrix. As shown on the drawing each of the lines 00–99 may be applied to the input of several different gates 208, 209 in program counter decoder 207. Thus, the 00 line is shown as being applied to two gates. Each gate in decoding matrix 207 also receives a PC signal derived from program counter 215.

The program counter 215 is not required for any of the instructions with which the present invention is concerned. The program counter is of use where instructions must be carried out which require more than a single minor cycle for the execution portion of their operation. During the execution time of such instructions it is necessary to inhibit production of certain signals which would normally occur in stepping the computer from one minor cycle to the next while such an instruction is in the process of execution. Also certain other signals must be generated during the execution of such an instruction. For this purpose a program counter is provided, but for sequencing and controlling the indexing instructions in the instant invention, the program counter is never required actually to count beyond zero it will remain fixed in its output at that zero count. It is assumed for the purposes of FIGURE 2 that counter 215 remains in the zero count during the operation described. The counter 215 may comprise a counter such as that shown on page 24 of the book "High Speed Computing Devices" published in 1950 by McGraw-Hill Publishing Company.

A plurality of output lines are obtained from the program counter decoder 207 and these output lines in turn are connected to and drive an encoding matrix 210. Certain lines within program counter decoder 207 are buffed together in buffer 275 to generate a signal used to control certain further elements in the machine as will become more apparent following a discussion of FIGURE 3. This signal is the CHRM signal and is required for all instructions wherein operands must be derived from the memory.

The output lines from encoder 210 are each labelled CHJP. Each of the output lines from decoder 207 when applied to encoder 210 causes encoder 210 to produce a plurality of the CHJP signals. Thus, a plurality of CHJP signals are generated for each instruction. Some of these (which are numbered) perform the same function but are generated on different instructions. The CHJP signals are required for a variety of purposes within the machine. In particular, CHJP signals are connected into the computer cycle control and switching elements 214 wherein they control a large number of further control elements. Further details of block 214 in FIGURE 2 are shown in FIGURE 3 and will be discussed with reference to the latter.

The CHJP signal lines are also connected into timing decoder 211 which comprises another gating matrix having therein a plurality of coincidence gates as, for instance, gate 212. Some of these gates may receive permissive signals from any one of a number of CHJP lines. Thus, if reference is made to FIGURE 3A it will be noted that CHJP signals 38 and 40 and 41 all operate as permissors for gate 334. Other CHJP signals with which the present invention is concerned and which are generated by various instructions appear on FIGURE 3 as CHJP 23, 29, 53, 26, 30, 32, 54, 56 and 57. These gates each receive a further input in the form of timing signals. Such timing signals are derived from clock 213 which has eight output lines from $t_0$ through $t_7$. Pulses are produced by clock 213 on each of its output lines once during each minor cycle. The gates in decoder 211 are also controlled by the output of block 214.

The output lines from decoder 211 are connected to the final encoder stage 211A which is a further matrix comprised of "or" gates. Since an encoder may produce a plurality of output lines upon receipt of a single input signal it will be understood that each output line from decoder 211 is thereby effective to excite one or more different output lines of encoder 211A. The outputs of encoder 211A are function table signals (FT) used to operate the various gates of FIGURE 1 as set forth in the description of a typical instruction as it progressed through FIGURE 1. The arrangement of decoder 211, encoder 211A, control 214 and clock 213 are described in connection with FIG. 3.

Refer now to FIGURE 3. FIGURE 3 is a detailed diagram showing the various elements and interconnections thereamong wherefrom is obtained each of the various function table signals required for the operation of the computer shown in FIG. 1. It should be noted, however, that specific function table signals required for operations within the arithmetic unit 131 are not obtained from FIGURE 3 but rather from FIGURE 5 as will be shown subsequently.

FIGURE 3 appears on four separate sheets labelled respectively 3A, 3B, 3C and 3D and these should be assembled as shown in the smaller block appearing on sheet 3A to understand fully this section of the computer. Referring, therefore, to sheet 3A of FIGURE 3, flip-flop 306 will be observed having a set input that is connected to the output of the gate 305. By means of a starting switch (not shown) a signal is applied to the start flip-flop 306 at time $t_2$. An input to the reset terminal from start flip-flop 306 also occurs at time $t_2$. Because of the construction of this and other flip-flops found throughout the machine when a set and reset signal are simultaneously applied to a flip-flop the set signal always takes precedence whereby the flip-flop will be placed in its set condition. Explanation of these flip-flops and their method of operation is reserved for discussion in connection with FIGURE 6.

Due to the inherent delays in all flip-flops found throughout the machine, output signals will be available one pulse time following input signals thereto. This will appear from the timing diagrams of FIGURES 9, 10 and 11 wherein the various signals are shown at the times in which they are actually set up in their respective registers and not at the times when timing signals are applied to the controlling gates. Thus, at time $t_3$ start flip-flop 306 will produce a start signal from its set output terminal. Such signal will be retained for one minor cycle until the next $t_2$ timing signal is applied to the reset input of the start flip-flop 306, whereupon start flip-flop 306 will produce a $\overline{\text{start}}$ signal from its reset output terminal.

The start signal is passed by gate 307 at time $t_3$ and the output of gate 307 is applied to one input of buffer 309. The output of buffer 309 is connected to the set input of C1–call flip-flop 314. At time $t_4$ flip-flop 314 produces an output signal from its set output terminal and this output terminal is connected to the inputs of three gates and one buffer respectively, gates 318, 319, 364 and buffer 315. It is to be noted that C1–call flip-flop 314 remains in its set output condition until the end of time $t_2$ of the following minor cycle, a reset signal being applied at $t_2$ At time $t_0$, of that following minor cycle, gate 318 is enabled to pass a $t_0$ timing signal because it is enabled by signals from C1–call flip-flop 314 and a start signal from the start flip-flop 306. By referring to FIGURE 3*b* which is concerned with a portion of encoder 211A of FIGURE 2, it will be seen that the output of gate 318 is the line from which the function table signals FT401 and FT411 are derived. In conjunction with FIGURES 3*b* and 3*d* which together show the details of encoder 211A it may be noted that the dots appearing at the intersection of lines therein represent diodes connected as buffers in the usual encoder matrix configuration.

It may be seen by reference to FIGURES 1 and 9 that function table signals FT401 and FT411 gate (at $t_0$) the contents of control counter 104 along with coded zeros into inputs 1 and 2 respectively of the B-adder 139, where they are established at $t_1$. This minor cycle initiating the call for an instruction represents the beginning of the instruction sequence at least for some purposes, and will be referred to hereinafter as the first minor cycle.

At time $t_0$ during the starting cycle of the machine gate 364 is not activated because in order to activate gate 364, the $\overline{\text{start}}$ signal is required from start flip-flop 306. It will be realized that on ensuing cycles of operation within the machine the start flip-flop 306 will be maintained in its reset condition whereby the $\overline{\text{start}}$ signal will be obtained therefrom. Thus, on succeeding calls from the C1-call flip-flop 314 the normal progression of signals at time $t_0$ will be through gate 364 and from reference to FIGURE 3B it will be seen that gate 364 picks up a line in the encoding matrix from which function signals FT401 and FTUA are derived. Thus, on calls after the first call, one is added to the contents of the control counter on each passage through the B-adder 139.

At time $t_2$ of the first minor cycle gate 316 receives a timing signal. Gate 316 is connected to the output of buffer 315 and the output of gate 316 in turn is effective to place a set signal on flip-flop 317. Also at time $t_2$, gate 319 passes a pulse to generate FT345 and FT363. Function table signal FT363 is effective as will be realized from FIGURE 1 to enable gate 140 to pass the output of the B-adder to memory address decoder 141. The function table signal FT345 enables the output of the B-adder to be read back into control counter 104 via gate 143.

At time $t_3$ flip-flop 317 will produce an output from its set output terminal and at $t_7$ of the first minor cycle such output will be gated through gate 308 thereby to set TA flip-flop 321 which, in turn, produces its set output signal at $t_0$ of the second minor cycle. At $t_2$ of the second minor cycle the output of TA flip-flop 321 enables gate 322 to derive two further function table signals in the encoding matrix of FIGURE 3B. From FIGURE 3B it will be observed that these are respectively FT320 and FT432. Referring again to FIGURE 1, in connection with FIGURE 9, it will be observed that the 320 function table signal enables the contents of the selected memory location, as previously determined by the control counter 104, to be read into instruction register 101. At the same time the function table signal FT432 in conjunction with FT320 enables the B digits of the instruction word from the memory to be passed through gates 117 into register selector register 118. Referring again to FIGURE 3A it will be seen that function table signal FT432 places a set signal on B-mod flip-flop 323. Accordingly, at time $t_3$ of the second minor cycle, B-mod flip-flop 323 will produce an output therefrom. This output is applied to the inputs of three gates 324, 325, and 326. During time $t_5$ of the second minor cycle gate 324 picks up a line in the encoder of FIGURE 3B which line produces four function table signals and these are respectively FT400, FT410, FT312, and FT425.

Referring again to FIGURE 1 in conjunction with FIGURE 9, it will be seen that function table signal 400 enables gate 136 to pass the M′ digits from IR-1 (101) into input-1 of the B-adder and FT410 enables gate 133 to pass a portion of the contents of a selected addressable register 121 into input 2 of the B-adder. Function table signal FT312 enables gates 102 and 103 to pass the I digits and the A digits of the instruction from IR-1 into sections 107 and 107A of IR-2 whereby the I digits are now available for decoding. Function table signal FT425 places a permissive signal on gate 122 thereby to enable regeneration of the addressable register as previously selected.

Referring back to FIGURES 3*a* and 3*b*, at time $t_7$ gate 325 will be enabled to pass a signal and gate 326 will be enabled to pass a signal provided that a CHRM signal has been obtained from the program counter decoder 207 of FIGURE 2. This latter signal will be derived for any instructions requiring an operand from the memory. Assuming that the present instruction is such an instruction, it will be observed that at $t_7$, gates 325 and 326 pick up two further lines in the encoding matrix of FIGURE 3*b* and these lines, in turn, derive function table signals FT311 and FT363. Function table signal FT363, as in the previous case, permits the gate 140 to pass the output of the B-adder 139 to the memory 152 via address decoder 141. On this occasion the purpose is, of course, to select an operand word from the memory. Function table signal FT311 allows gates 105 to pass the output of the B-adder into section 108 of IR-2 whereby this section of IR-2 now stores the modified M digits of the instruction.

Figure 3B:
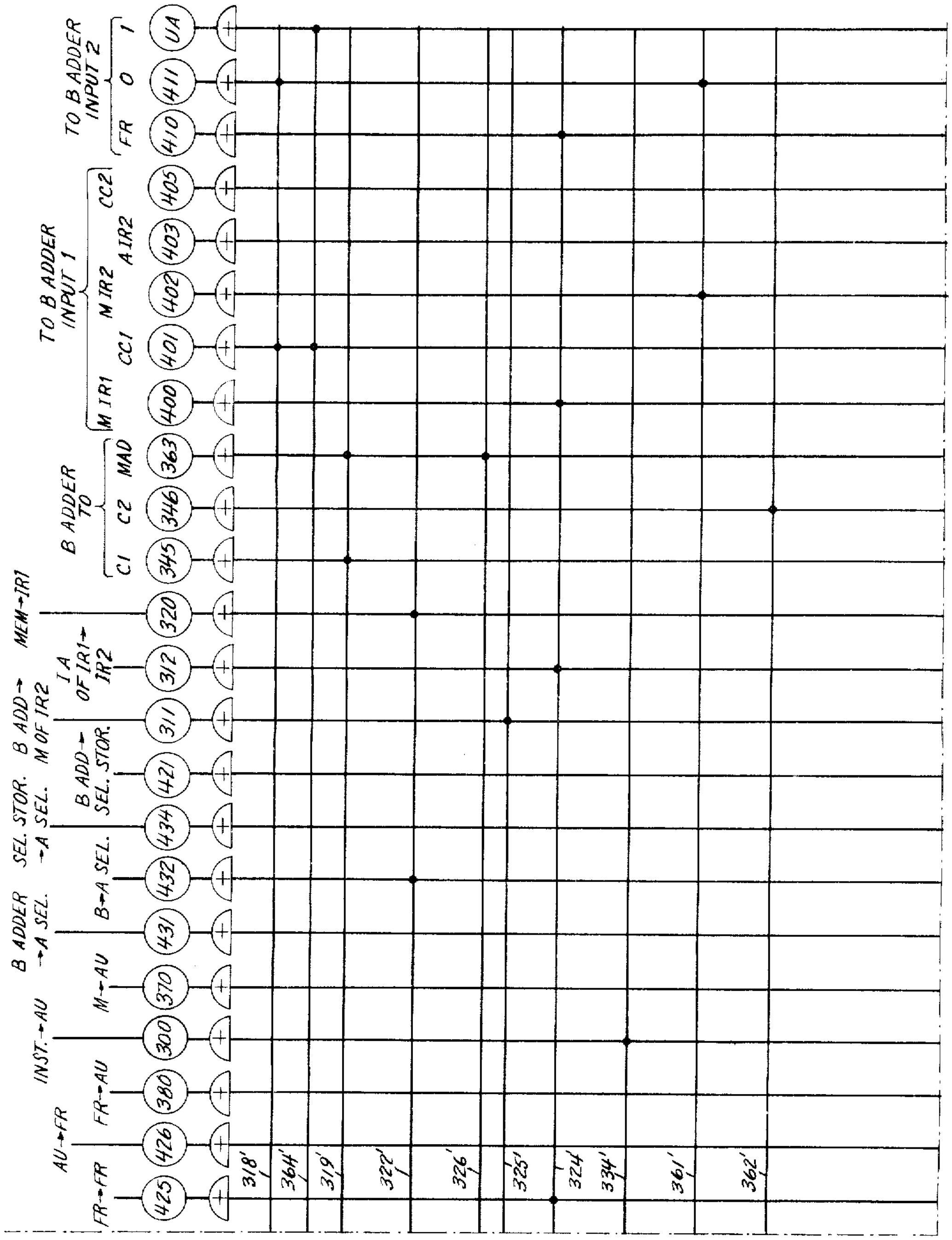

At time $t_7$ of the second minor cycle a reset signal is applied to TA flip-flop 321 and at the same time gate 327 is enabled to pass a set signal to TB flip-flop 328. With TB flip-flop 328 producing a set output signal at time $t_0$ the third minor cycle of operation is now entered. During this third minor cycle various CHJP signals are produced by the output of encoder 210 of FIGURE 2. As previously indicated during the discussion of FIGURE 2 such signals are used for a variety of purposes in deriving the ultimate function table signals as shown in FIGURE 3*b*.

Figure 3C:
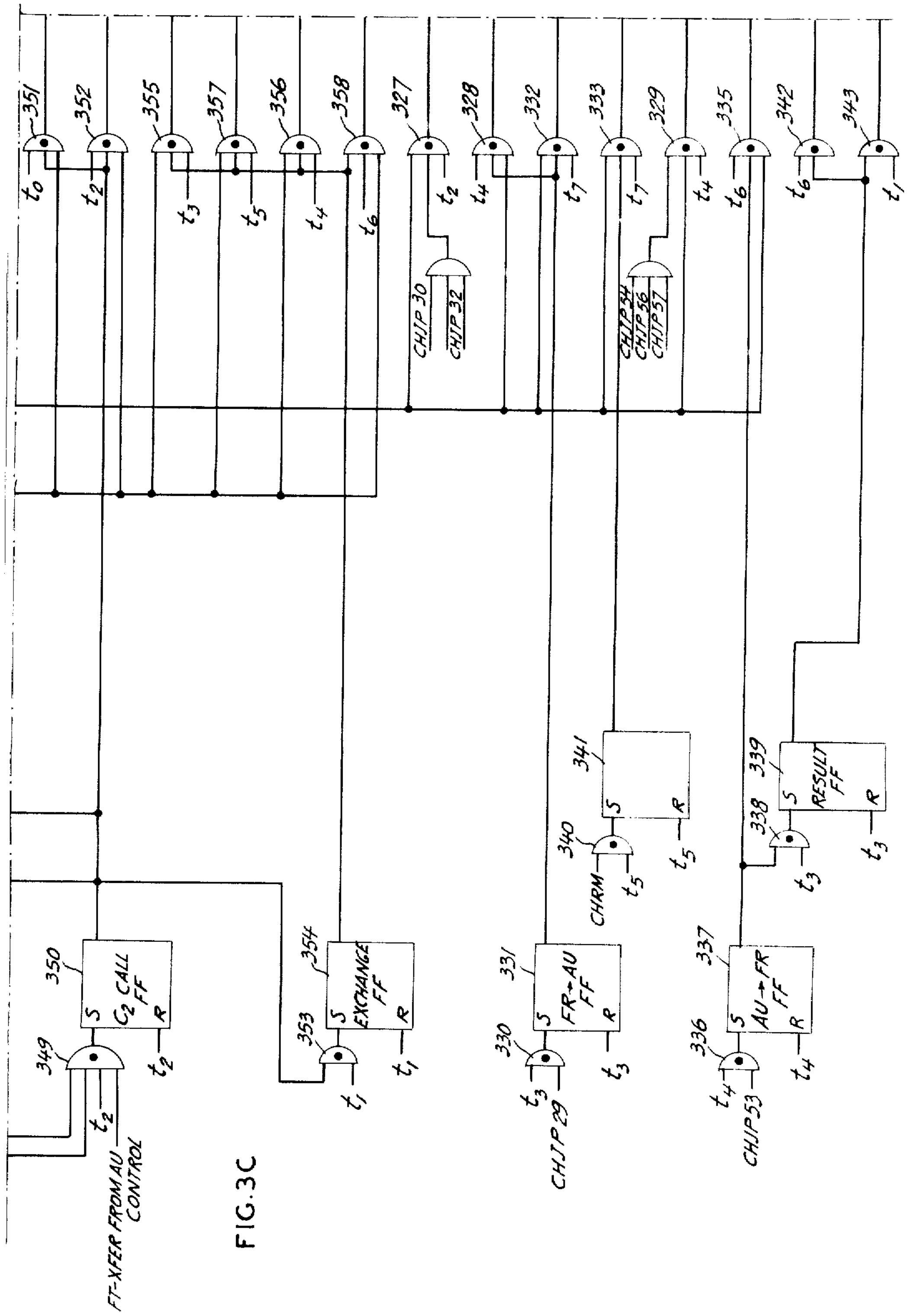
Figure 3D:
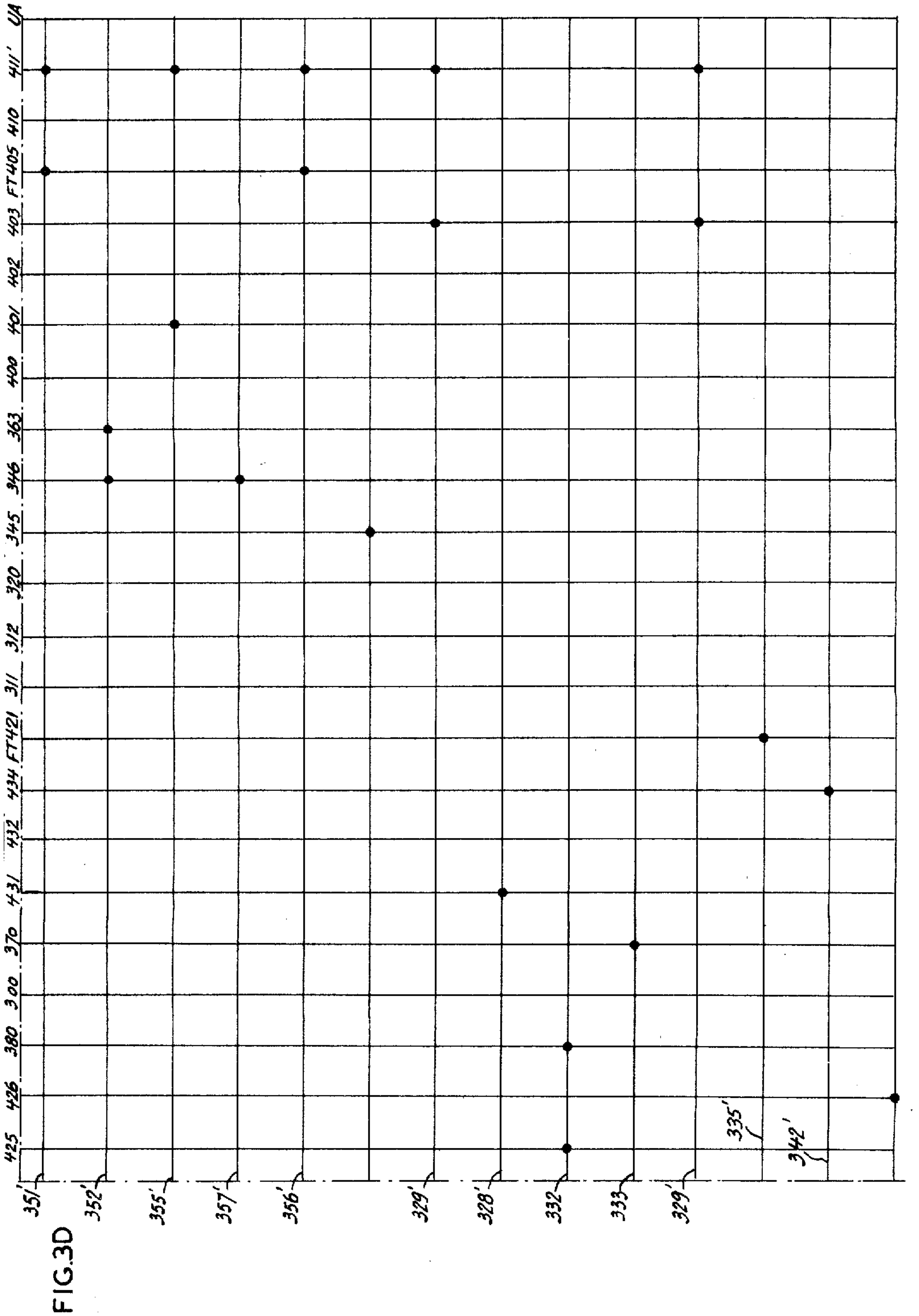

Consider FIGURES 3*c* and 3*d*. In FIGURE 3*c* gate 327 receives a permissive signal from the output of TB flip-flop 328 and may receive one of several CHJP signals depending on which particular instruction is about to be executed. Regardless of which such CHJP signal is received, provided that one appears at $t_2$ of the third minor cycle, gate 327 picks up a line shown in FIGURE 3*d* from which, it may be seen by way of FIGURE 3*b*, two function table signals are derived, namely, FT403 and FT411. Function table signal FT403 enables gate 134 in FIGURE 1 to pass the contents of section 107A of IR-2 into input-1 of the B-adder 139. Function table signal 411 as in previous cases passes zeros into input-2 of B-adder 139. From the timing diagram of FIGURE 9 it is apparent that these inputs actually are established in the B-adder by time $t_3$ of the third minor cycle.

At $t_3$ a CHJP signal is passed by way of gate 330 to the set input terminal of the AR to AU flip-flop 331 so that at $t_4$ flip-flop 331 is producing a set output signal. Such signal is applied to gates 332 and 328. The $t_4$ pulse is passed by gate 328 to line 328′ of the encoding function table which derives FT431. It will be observed from FIGURE 1 that this FT431 signal enables gate 115 to pass the output of the B-adder into register selector register 118 so that an addressable register operand word may be selected. Also occurring at $t_4$ of this minor cycle is the setting of the AU-to-AR flip-flop 337 by way of a CHJP signal and a $t_4$ pulse applied through gate 336. When a set output signal is produced from this flip-flop at $t_6$ it is applied to gate 335.

Referring back to FIGURE 3*a* it will be observed that a number of CHJP signals in conjunction with the set output condition of TB flip-flop 328 will place enabling signals on the gate 334 to pass the $t_5$ pulse. Thus, gate 334 is enabled to pass a signal to line 334′ in the encoding function table thereby to derive the 300 function table signal. This latter signal, as previously discussed, is effective to pass the encoded I digits of the instruction from AU encoder 110 into the AU control circuits 130 via gates 132. The timing pulse $t_4$ of the third minor cycle is also applied to gate 329 with an appropriate CHJP signal. Gate 329 is effective to produce function table signals FT403 and FT411 whereby the A digits held in section 107A of IR-2 are again passed through the B-adder 139 and zeros added thereto.

The timing pulse $t_5$, together with the CHRM signal, is applied by way of gate 340 to set flip-flop 341, the output of which will be available at $t_6$. At $t_6$ gate 335 is effective to supply a pulse to line 335′ in the encoding function table for generating function table signal FT421, and this signal, as may be determined from FIGURE 1, permits the output of B-adder 139 to be passed into selector storage 113 by way of gate 112. At $t_7$ since TB flip-flop still produces its output signal and since flip-flops 331 and 341 are set, gates 332 and 333 are enabled to pass $t_7$ and to generate function table signals FT370, FT380 and FT425. Function table signal 370 enables gate 146 to pass the contents of the selected memory location storing the desired operand word from the high speed bus into the M input register 150 to be established there at $t_0$ of the fourth minor cycle. Function table signal FT380 similarly permits a selected operand word from the addressable registers 121 to be read into the arithmetic unit via gates 128 and pulse formers 129. As in previous instances function table signal FT425 enables regeneration of the addressable register by way of gate 122, buffer 123 and pulse former 151.

At time $t_7$ of the third minor cycle TB flip-flop 328 receives a reset signal and TC flip-flop 365 receives a set signal by way of gate 344. During this fourth minor cycle the instruction is executed in the arithmetic unit and since all instructions with which the present application are concerned require but one minor cycle for execution most of the activity during this time will be found within that unit as will be subsequently discussed.

However, during this fourth minor cycle a permissive signal is applied to gate 366 from the TC flip-flop 365 which allows gate 366 to pass a $t_3$ timing signal. The output of gate 366 enables setting of C1–call flip-flop 314 via buffer 309 whereby the next instruction in the sequence is called for. Also during the fourth minor cycle at $t_3$ the result flip-flop 339 is being set by way of gate 338 since the set output signal is still obtained from AU–to–AR flip-flop 337. At $t_6$ accordingly gate 342 supplies a pulse to generate signal FT434. Reference again to FIGURE 1 will show that FT434 permits gate 114 to pass the contents of selector storage 113 to register selector register 118 whereby an addressable register is thereupon selected for storage of the result shortly to become available in the arithmetic unit. Since result flip-flop 339 is not set until $t_4$ of the fourth minor cycle, gate 343 will not be enabled to pass signals until $t_1$ of the ensuing minor cycle. At $t_1$ in the fifth cycle, however, gate 343 is enabled to generate FT426. From FIGURE 1 it will be observed that this latter signal permits gate 126 to read the results obtained from the arithmetic unit 131 via gate 126, buffer 123 and pulse formers 151 back into the addressable registers 121 and into the register which was selected by means of register selector register 118 and register selector decoder 120. Subsequent operations will follow the same pattern for standard instructions except, of course, that following the starting operation the $\overline{\text{start}}$ signal will appear on start flip-flop 306 whereby the output signal from C1–call flip-flop 314 will pass via gate 364 rather than via gate 318, whereby the contents of control counter 104 will be increased by one upon each passage through B-adder 139.

The remaining components shown in FIGURE 3 are concerned with derivation of signals during a transfer of control operation such as are to be encountered in connection with the indexing instructions to be described hereinafter. Detailed consideration of FIGURE 3 in connection with this latter derivation of signals will follow discussion of the indexing instructions themselves.

To introduce the description of indexing, the contents of a typical indexing or B register will first be examined. Such a register, as has been previously explained, upon receipt of proper signals is effective to read out a portion of its contents into the B-adder where such contents are added to the M address portion of the instruction then in IR–1. However, the B registers, that is to say, those of the addressable registers designated by the B address, contain more than that portion which is added to the M address. The contents of a typical B register may be designated as follows:

NNN DDDD *bbbbb*

These respective portions will hereinafter be designated as the counter, the increment and the B-modifier. It is the modifier portion *b* only which is added to the memory address; the MMMMM portion of the instruction. The *b* digits may each assume values of 0 to 9. The increment portion D is used to vary the modifier portion *b* and it may effect such modification either by being added to the modifier or subtracted from the modifier. This function is necessary for each repetition of a program loop. Thus, the first time a loop comprising a given set of instructions is traversed the modifier portion *b*, as found in a selected B register, might consist entirely of zeros. This would mean that the operands selected would be actually addressed by the original M address of the various instructions. However, on subsequent traversals of the loop using the same set of instructions over again, it would be necessary to alter the M address by some constant amount whereby a new set of M operands could be selected. For this purpose an increment or a decrement to the modifier is provided. This particular function is fulfilled by the D digits contained in the designated B register. Each of the D digits may have values of 0 to 9, so that the increment may assume values 0000, 0001 and so on to 9999.

The function to be performed by the counter digits indicated as NNN is that of a counter. In effect, these digits determine the number of times that a given program loop will be traversed. It is evident from the number of counter digits provided (each of which may assume values of 0 to 9) that up to 1,000 loop traversals may be provided from a single index or B register. The N digits forming the counter portion enable the performance of one further function which is to provide a transfer of control signal whereby the computer is enabled to jump out of a given sequence of instructions into an entirely different sequence.

In order to carry out the indexing feature of the computer special instructions are provided. These instructions are stored in the memory along with the other instructions and are called upon by the control counter in the same manner as the other instructions and to a certain extent go through the same basic steps as hereinabove outlined in connection with the basic type of add instruction. The invention in particular provides for six different indexing instructions. Within the actual computer these may appear as follows:

80 AA BB MMMMM
81 AA BB MMMMM
82 AA BB MMMMM
83 AA BB MMMMM
85 AA BB MMMMM
86 AA BB MMMMM

It will be observed that the indexing instructions themselves take precisely the same form as any of the other instructions. In the 80 instruction the 80 represents the I digits and, of course, designates the operations which are to be carried out. The AA digits represent the address of an index register to which the 80 instruction is to apply. While we are concerned with the contents of an addressable register normally used as a B register, it will be evident from the foregoing discussion of the elementary instruction that any designation in the B digits of the 80 instruction will, as in the previous instance, simply serve to apply the partial contents (*bbbbb*) of the B register designated thereby to the M digits of the instruction.

The M digits forming a portion of one of the indexing instructions perform a function much different from that of the M digits normally found in an instruction. Rather than selecting the address of an operand from the memory these M digits may designate an address to which control is to be subsequently transferred.

Consider now the functions performed by each of the indexing instructions in turn. Probably the most frequently used of these instructions will be the 80 instruction. Each time the 80 instruction is encountered as, for example, after the last instruction in a loop has been executed, it will cause the following operation to be performed. First, the N digits or the counter portion of the addressable register designated by AA of the 80 instruction will have 1 subtracted therefrom. The contents of this counter NNN will then be tested to determine whether or not it reads zero. If it does read zero indicating that all of the successive loops of the program have been completed the contents of the control counter CC–1 (104) will be passed through the B-adder, increased therein by one and thereafter will extract the next instruction in the main program. Such next instruction will as hereinbefore outlined be read into instruction register 1 (101) and the program will continue normally.

In addition to this decrease in the counter the D digits from the designated addressable register will be added to the modified portion *bbbbb* found therein. Now, if upon testing the counter it does not read zero, indicating that the sub-program has not completed the required number of loops indicated originally by the counter, then a signal is derived from the arithmetic unit where these various operations in the contents of the designated addressable register are being carried out and this signal causes the computer to transfer control. The transfer of control takes place to the address designated by the M digits of the 80 instruction. Under this arrangement, a series of instructions forming a loop may be terminated with an 80 instruction, the M portion of which designates the address of the first such instruction in the loop. Upon receipt of the 80 instruction, provided that the number of loops called for by the N digits of the designated register AA has not been completed, control will be effectively shifted from the address of the final instruction of the loop back to the address of the first instruction in the loop. The loop is then repeated successively for the N iterations until N is zero. When N is zero there is no transfer of control and control continues from the control counter in the usual fashion.

The 81 instruction performs essentially the same function as the 80 instruction. The only difference in the case of the 81 instruction is that the increment D digits of the designated addressable register are subtracted from the modifier *b* digits rather than added as was the case in the 80 instruction. Otherwise the operations are the same.

The 82 instruction acts in a somewhat different manner. However, as in the case of the 80 and 81 instructions the counter portion of the designated addressable register is decreased by one each time this instruction is received. As in the case of the 80 instruction the D digits of the designated register are added to the *b* digits and as in the case of both of the prior instructions the counter portion after having been decreased by one is tested for zero. However, in the case of the 82 instruction if the counter reads zero indicating that all loops are completed, then transfer of control is effected to the memory address M of the 82 instruction. This is to be compared with the 80 instruction wherein transfer of control to the designated memory address occurred only when all loops were not completed. In case the counter portion of an 82 instruction does not read zero then the control counter contents are increased by one and the next instruction in the regular program is carried out. This may be compared with the 80 instruction wherein this latter operation took place only after the counter indicated zero showing all loops to be completed.

The 83 instruction is substantially the same as the 82 instruction except that instead of adding the D digits to the *b* digits of the designated addressable register the D digits are subtracted therefrom.

In the 85 and 86 indexing instructions, the counter portion of the designated registers in unaffected and no transfer of control takes place under any circumstances. Instruction 85 adds the D portion of the designated addressable register to the *b* portion thereof whereas the 86 instruction subtracts the D portion of the designated A register from the *b* portion thereof.

A summary of these hereinbefore described indexing instructions is herewith presented in tabular form for quick reference.

| Numeric Code | Instructions | Description |
|---|---|---|
| 80 | N−1→N | Counter is decreased by 1 each time the sub-routine is traversed. |
| | b+D→b | "B" digits of B register are increased by amount designated by D. |
| | If N=0, (C) +1→C. | If counter reads zero after the subtraction (all loops completed) increase the control counter by 1 and continue to next instruction in program. |
| | If N≠0, M→C | If counter does not read zero (required number of loops not finished) transfer to the memory address M of the present instruction. |
| 81 | N−1→N | Same as 80. |
| | b−D→b | The b digits of the B register are decreased by the amount designated by D. |
| | If N=0, (C) +1→C. | Same as 80. |
| | If N≠0, M→C | Same as 80. |
| 82 | N−1→N | Same as 80. |
| | b+D→b | "b" digits of B register are increased amount designated by D. |
| | If N=0, M→C | If counter reads zero (all loops completed) transfer control to the memory address M of the present instruction. |
| | If N≠0, (C) +1→C. | If counter does not read zero, increase the control counter by 1 and continue to next instruction in program. |
| 83 | N−1→N | Same as 80. |
| | b−D→b | The b digits of the B register are decreased by the amount designated by D. |
| | If N=0, M→C | Same as 82. |
| | If N≠0, (C) +1→C. | Same as 82. |
| 85 | b+D→b | Increase the b digits of the B register by the amount designated by D only. |
| 86 | b−D→b | Decrease the b digits of the B register by the amount designated by D only. |

*Arithmetic unit*

We now consider how the various indexing instructions may be carried out utilizing the computer arithmetic unit 131. For this purpose, reference is made to FIGURE 4 which is a diagram showing certain portions of the arithmetic unit which are used in performing the indexing instructions. It will be evident from the nature of the instructions themselves that many possible means exist by which they may be carried out and the means shown is in fact only one of those that are possible. The reasons for carrying out the instructions in the manner shown and described herein result from the inherent structure of the arithmetic unit itself wherein such unit must be capable of carrying out a great many different operations.

The basic components within the arithmetic unit are the adder 412 and the shifter 419. In addition, there are provided various registers such as the AF register 410 and the result register 423 as well as selecting matrices such as AX select 411, AY select 413 and Shift select 418. In addition, to these are provided gates and buffers interconnecting the various units and permitting a transfer of signal thereamong upon receipt of the appropriate function table signals.

Thus, from the addressable registers 121 of FIGURE 1, gates 128 will pass the contents of a designated register into the A input amplifier and pulse former 129. The output of pulse former 129 is connected via gate 409 and buffer 452 into AF register 410 and also via gate 409, buffer 452 and gate 425 to AX select 411. The output of this register 410 is connected to AX select via gate 425 and to shift select 418 via gate 417. The output of AX select 411 is connected to one input of adder 412 via gate 427 and is also connected back into the input of AF register 410 via gate 429.

Adder 412 is provided with a number of inputs additional to that from AX select 411. Thus the output of AY select 413 is connected into adder 412 via gate 421, and complementing matrix gate 414. Gate 414 operates as a complementer; that is to say, the output of gate 414 will be the nines complement of any input thereto. Gate 421 provides a direct output so that the output therefrom will be the same as the input thereto. The purpose of gates 414 and 421 will become more apparent as the description proceeds. Other inputs to the adder 412 include a unit-add pulse source FTAE whereby when required a unit and to the least significant digit position may be provided. Still further inputs to adder 412 appear in the form of function table signals FTAR, FTAP and FTAF. The necessity for these will also become more apparent as the description proceeds. The output of adder 412 is connected to the AU result register 423 via gate 431 and in a recirculation path to the input of AX select 411 via gate 426. Two further outputs 432, 432' from the adder indicate the result of zero comparisons with the three most significant digits NNN.

The input of shifter 419 is connected to the output of shift select 418. The output of shifter 419 is recirculated into shift select 418 via gas 430 and is connected via gate 420 into the input of AY select 413. Shifter 419 is provided with control signals shown as FTL3 and FTR8 which serve to determine the direction and magnitude of the shift required. Obviously where other shifts are required they may similarly be provided through additional function table signals. AY select 413 is provided with a second input; from a register 450 a word made up of twelve decimal zeros is gated into AY select 413 via gate 428.

Further details of adder 412 are shown in FIGURE 7 and further details of shifter 419 are shown in FIGURE 8.

Clear signals are applied to AF register 410 as indicated at $t_7$ and $t_2$ and a clear signal is applied to result register 423 at $t_5$.

The operation of the arithmetic unit for the 80 instruction series is as follows:

When an 80 instruction is addressed by control counter 1 (104) in FIGURE 1, such instruction is subsequently read into the instruction register 1 (101) as in the case of any other instruction, and up to a certain point this instruction proceeds through the regular chain of components in the same manner as any other instruction. Thus, the 80 digits themselves are eventially read through the instruction decoder 109 and into the control circuits 148 as well as through the arithmetic unit instruction encoder 110 and subsequently into the arithmetic unit 131. The A digits also operate to select the designated addressable register and to transfer the contents thereof to the arithmetic unit 131.

The contents NNN DDDD *bbbbb* of the designated addressable register are placed in the arithmetic unit (AF) register 410 in response to FT102, and also in response to FT121 into AX select 411. AX select 411 comprises a large buffing array which serves to receive information signals from a number of different locations within the arithmetic unit, such signals eventually being gated into adder 412 by way of coincidence gate 427. The subtraction of one from the N digits is performed in the adder 412 by means of the input from AY select 413. AY select 413 as in the case of AX select 411 comprises a buffer array whereby inputs to the adder from a number of sources may be provided.

Signals representing a word of twelve decimal zeros are gated by FT137 from zero register 450 into AY into AY select 413 via gate 428. Gate 414 is operated by FT112 and is effective to convert the decimal input thereto to the nines complement. Thus, when zeros are gated into AY selected 413 complementer gate 414 subsequently supplies nines to the second input of the adder. At the same time the number itself from the AX select 411 is gated into the other input of adder 412.

As inputs to the adder 412, besides (1) the contents of the addressable register and (2) the word of nines, are (3) a unit add signal FTAE (which is the carry input to the least significant digit) and (4) a signal FTAF which blocks carries from the ninth into the tenth digit position (described below with respect to FIG. 7). These signals produce the following arithmetic where the slant bar (/) is used to represent the carry block.

| | | |
|---|---|---|
| 525 | 0010 | 00000 |
| 999 | 9999 | 99999 |
| | / | 1 |
| 524 | 0010 | 00000 |

Upon considering the net result of this operation it will be evident that the counter portion 525 will be reduced by one and the remaining part of the number will be unchanged. The output of the adder which represents the original contents of the B register being operated on with its counter portion decreased by one is gated via gate 426 back into AX select 411.

Immediately following the unit subtraction from the counter portion NNN, the new NNN is compared to zero. This comparison may take place in a set of comparison gates, the details of which are to be found in FIGURE 4A. Depending on whether or not a zero comparison is achieved a signal will be sent on line 432 or 432' to the AU control circuits of FIG. 5, and these control circuits will subsequently determine whether or not a tranfer of control is to be effected.

The contents of the aforenoted addressable register having had the counter portion thereof reduced by one and having been subsequently gated into the AX select 411 are thereafter gated back into the register 410 via gate 429 and buffer 452 to be stored therein until further required.

Prior to this process of gating back into register 410 the number as originally placed therein from the addressable register is read out a second time by means of a signal FT126 applied to gate 417. The number subsequently goes into shift select 418 and thereafter through a shifting circuit 419. This shifting circuit 419 comprises a buffing and gating array and is controlled by various function table signals so that a variety of different shifts may be obtained as desired. As is the case of most of the other arithmetic unit components the shifter 419 is extensively used for many other operations aside from and in addition to that of the present invention. Further explanation of the operation of this shifter 419 will be found subsequently in this description in connection with the description of individual components. It is sufficient to note that on first passing through the shifter 419 the number passing therethrough is shifted left three digits. Now since the number and the general circuits for transmitting the number from place to place throughout the machine provides for twelve digits only, it will be evident that when a left shift of three places is brought about the three digits comprising the N portion of the register contents will be lost. Zeros are shifted into the other end of the number to take care of the blank spaces which would otherwise occur. The number as shifted is then recirculated back to the shifter select 418, via gate 430 to which function table signal FT128 is applied at the proper time. Again appropriate signals are supplied to the shifter 419 whereby the number passing through is shifted right eight places. This results in casting off the eight least significant digits comprising the three zeros previously shifted in and the five *b*'s of the modifier portion. Zeros are also, as in the previous instance, shifted into the most significant eight digit positions. Thus, the number after the first shift (left three places) would emerge from the shifter as follows assuming the same B-register number (525 0010 00000) as previously used.

001 0000 00000

Following the succeeding shift wherein the right shift of eight spaces took place, the number would appear as follows:

000 0000 00000

After emerging from the shifter the second time, the thus shifted number is passed through gate 420 to which FT120 is applied into AY select 413. At the same time the number with its counter portion now reduced from the previous operation is gated from the register 410 into AX select 411 via gate 425 so that it may be once again gated into the adder 412. Again the gating network connected to the output of AY select 413 is brought into use and its manner of operation will be dependent upon whether an 80 or 81 instruction is being performed or an 82 or 83 instruction. In the case of an 80 or 82 instruction wherein the D portion of the fast register is to be added to the *b* portion thereof, gate 421 providing no complement of the number passing through AY select 413 will receive signal FT113. In the case of the 81 or 83 instruction wherein D is to be subtracted from *b* the complement gate 413 will receive signal FT112. In the event that the complement gate 414 is used, a unit add FTAE is supplied via the buffer 415.

The outputs from AX select 411 and AY select 413 are thereafter gated into adder 412 (along with the unit add when required for subtraction). Because of the fact that the input to the AY select 413 represents the original number as manipulated by the shifter it will be evident that where an addition was desired the sum output of the adder will hereinafter appear as follows:

524 0010 00010

One further contingency must be provided for, assuming the same number as formerly, and assuming that an 81 instruction was received rather than an 80 instruction, the 81 instruction, of course, requires a subtraction of the increment portion from the modifier portion. This is provided for by complementing the shifted AY factor via gate 414 after it has passed through AY select 413. As in the previous instance, where a subtraction is to be carried out the unit add is provided by way of buffer 415. Herein, however, it is noted that the subtrahend portion, namely the output of the AY select 413 is greater than the minuend portion represented by the output of AX select 411 at least as far as the digits in the *b* portion are concerned. This means that when the complement addition is carried out it will be necessary to stuff a carry into the sixth digit position. Thus the example might appear as follows:

```
524  0010  00000
999  9999  99989 Nines complement of 000 0000 00010
---------------
               1 Unit add
524  0009  99990
```

It is evident that unless a carry is stuffed into the sixth digit position, the effect of this subtraction will be to alter the D digits in an undesired manner, in effect, subtracting one therefrom. Accordingly, in the event that such a subtraction is to be carried out, a function table signal FTAR stuffs the required carry into the sixth digit position.

The number as thus variously manipulated is placed in the arithmetic result register 423 from which it may subsequently be returned to the appropriate addressable register indicated by the A digits of the instruction and from which fast register it was originally obtained. The contents of this addressable register will now provide a different B-modification factor to successive instructions which may call for such B register.

For simplicity of illustration, the portion of the arithmetic unit 130 shown in FIGURE 4 is directed to the performance of the arithmetic operations associated with the indexing instructions. In the latter, the only operand input is from an addressable register, none being supplied from the memory. In the more usual instruction operands are supplied both from an addressable register and from the memory via register 150. The path of one of these operands through the arithmetic unit is shown in FIG. 4 would be via one of the AX and AY selects 411 and 413, respectively, and that of the other operand would be via the other of these selects. The operands would be supplied to the adder 412 and therefrom through the result register 423 and back to an addressable register.

Consider now FIGURE 5 which relates to the AU control 130 of FIGURE 1. FIGURE 5 is similar in purpose to FIGURE 3. Whereas FIGURE 3 is concerned with a method of generating gating or function table signals for effecting operation of the circuits of FIGURE 1, FIGURE 5 is concerned likewise with the generation of function table signals but in this case they control the operation in proper sequence of the elements of the arithmetic unit more particularly shown by FIGURE 4 and to some greater detail in FIGURES 6 and 7.

FIGURE 5 shows a plurality of switching matrices or function tables. The input so far as FIGURE 5 is concerned is depicted by block 110 and this corresponds to blocks 110 in FIGURES 1 and 2. Block 110 as previously explained represents the array of buffers used for encoding instruction digits. Since, as previously explained, there are two instruction digits each comprising five binary digits, it is possible to decode each such instruction digit into ten separate output lines in each case number 0 through 9. Subsequently, by gating between the various output lines of each of the decoded instruction digits 100 different output lines may be provided and these 100 different output lines may in turn represent 100 different instructions. In FIGURE 1 it was observed that outputs from these 100 different lines are subsequently directed into an encoding matrix 110 on FIGURES 1 and 2. On FIGURE 5, gate 132 is shown in the form of six separate input gates indicated respectively as **132*a*–132*f*. These gates correspond in turn with instructions 80, 81, 82, 83, 85 and 86. A subsequent encoding matrix 500 as found in AU control 130 (FIGURE 1) is shown with the detail necessary for deriving the function table signals required for these particular instructions. Four output lines are derived from this encoding matrix 500 and these are indicated respectively as 510, 511, 512 and 513 in FIGURE 5. An output appearing on any of these lines will be effective to set a flip-flop connected thereto, thus an output appearing on line 510 will be effective to set flip-flop 501 labelled AUFF–1, an output on line 511 will set flip-flop 502, an output on line 512 will set flip-flop 503 and an output on line 513 will set flip-flop 504**. Such flip-flops constitute a static register for storing arithmetic unit instruction.

It is to be understood, of course, that whereas in the present instance only four output lines have been shown from the encoding matrix 500 and only four instruction flip-flops have been shown it will be necessary in a general purpose arithmetic unit to provide many more such flip-flops to store signals representing all of the many instructions possible. Furthermore, it will be necessary to provide elements such as a program counter effective to vary the outputs of the static register formed by the flip-flops when instructions taking a number of program steps requiring more than one minor cycle are to be performed. In the present instance we are concerned only with the 80 series of instructions as previously described and none of these require the use of such a program counter. Accordingly, for simplicity and ease of understanding of this invention the program counter is not shown.

The outputs from these flip-flops 501–504 inclusive are used to drive a decoding function table or gating matrix 506. This matrix comprises a plurality of gates each of which requires a plurality of signals to be applied thereto so an output may be derived therefrom. Such permissor signals are supplied in part by the static register comprising flip-flops 501–504 inclusive. Further signals $t_0$–$t_5$ to be applied to said gates are obtained from a timing generator 550 (which may correspond to $t_0$–$t_5$ outputs of clock 213 in FIGURE 2). For decoding gates 523 and 524 further permissor signals 432 and 432' are supplied by the circuit of FIGURE 4A which tests the counter portion NNN of an indexing word for zeros after such indexing word has had one subtracted therefrom by the adder 412 of FIGURE 4.

The output of this decoding matrix 506 is applied to an encoding matrix 507. Such encoding matrix which, as hereinbefore explained, may provide one or more output signals upon the receipt of a single input signal, in turn supplies the actual function table signals necessary to enable the gates of FIGURE 4 to pass their respective information in a proper time sequence.

Consider now how the requisite function table signals for a specific indexing instruction are to be obtained. Assume the instruction to be an 81 instruction. As hereinbefore noted the 81 instruction requires that "1" be subtracted from the counter portion NNN of the selected register and that the increment DDDD of the number contained in the selected register be subtracted from the modifier portion *bbbbb* thereof. Assuming the instruction to have been duly called for and in turn entered into the instruction register 107 as shown in FIGURES 1 and 2 and subsequently decoded therein, it will be seen that with the receipt of the FT300 signal gate 132*b* will be rendered permissive so that the appropriate line may pass a signal corresponding to this 81 word into the encoding matrix 500. The encoding matrix 500 will produce output signals from each of lines 510, 511 and 512. From the signals appearing on these particular lines and from what has been set forth previously it will be seen that flip-flops 501, 502 and 503 will be set while flip-flop 504 will remain reset as having received no such set signal. Flip-flop 501 in all cases involving one of these instructions will receive a signal from encoding matrix 500 by way of output line 510. The set output of this flip-flop applies a signal to all of the input lines of the decoding matrix 506. From the foregoing remarks made in connection with the decoding matrix 506 it is evident that further inputs must be supplied thereto in order to effect an output therefrom on any of the lines. Some of these further signals will be furnished by others of flip-flops 501–504 which have been set by output signals from encoding matrix 500 or in certain cases supply reset signals to the aforesaid decoding matrix 506. Also as mentioned hereinbefore the timing generator 550 will supply a regular sequence of timing input pulses to decoding matrix 506.

Recalling now that flip-flops 501, 502 and 503 are all set, examine matrix 506 and matrix 507 for an understanding of what is to happen. On line 514 of decoding matrix 506 at $t_0$ an output signal will be obtained from said line and such output signal in matrix 507 generates three function table signals FT102, FT121 and FT137. From a consideration of FIGURE 4 it will be seen that FT102 permits register 410 to be filled while the gates 425 controlling the passage of the contents of the selected addressable register to AX select 411 receives permissive signal FT121. Function table signal FT137 allows decimal zeros to be placed into AY select 413.

At $t_1$ it is evident that four more output signals will be encoded as a result of an output from decoding function table line 515. These four output signals occur on lines 528, 529, 530 and 542 of encoding matrix 507 and in turn derive function table signals FTAE, FT112, FTAF and FT114. Considering once again FIGURE 4 it will be observed that function table signal FT114 is effective to gate the contents of the AX select 411 into adder 412 while function table signal FT112 permits gate 414 to complement the zeros placed in the AY select 413 and transmit the 9's resulting therefrom into the other input of the adder 412 all for the purpose of subtracting "1" from NNN. Function table signals FTAE and FTAF are respectively effective to add "1" into the least significant digit position of the number passing through the adder and to block carries from the ninth into the tenth digit position. All of the foregoing operations have previously been explained in connection with FIGURE 4 itself.

At time $t_2$ considering line 516 of the decoding matrix 506, it will be evident by tracing the output of the line on FIGURE 5 that two further function table signals are derived. These are FT123 and FT126 which are respectively effective to cause recirculation of the output of the adder via gate 426 and to effect transfer of the number being held in register 410 into the shifter circuit via gate 417.

At time $t_3$ two lines of the decoder 506 will be selected when an 81 instruction is being performed, namely, lines 517 and 518. Line 517 is encoded as shown by lines 533 and 534 of function table 507 thereby to derive function table signals FTL3 and FT128. From previous considerations of FIGURE 4 it will be realized that these function table signals effect the first shifting operation via shifter 419 and gate 430. Line 518 of the decoding function table is effective to produce one signal by way of line 536 on the encoding function table 507. This is the FT109 signal and this is effective as previously explained to permit gate 429 to pass back into register 410 the number being manipulated with its counter portion reduced by one.

At time $t_4$ it is observed that line 519 of the matrix 506 produces an output signal which output signal is subsequently encoded to produce outputs on lines 526, 537 and 538 of encoding matrix 507. These signals are respectively the FT121, FT120 and FTR8 and in turn provide for completion of the shifting operations and once more gating the contents of register 410 into AX select 411.

At time $t_5$ lines 521 and 522 will be activated in decoding matrix 506. Decoding line 521 produces three function table signals from the encoding matrix 507. These are respectively FTAE, FT112 and FTAR. Line 522 of decoding matrix 506 places a signal on line 542 and line 540 of encoding matrix 507 giving respectively function table signal FT114 and following a one pulse delay through delay 508, function table signal FT125. As hereinbefore explained in connection with FIGURE 4, these various function table signals enable the subtraction of the D digits from the *b* digits by providing the required complements and stuffing carries as required in the sixth digit position and finally passing the results into the result register via gate 431.

FIGURE 4A illustrates a logical arrangement for supplying a signal indicating whether all of the counter digits N1, N2, N3 are equal to zero or whether at least one is not equal to zero. The decimal digits N may be assumed to be made up of four binary bits together with a fifth bit for parity check in a conventional code. The code may be of various types, an example of one that is suitable is a 5–4–2–1 code that is, in which the three lowest significant digits take on the values of 1, 2 and 4 successively in the usual binary fashion, and in which the most significant digit takes on the value of 5 or 0. In the logic arrangement of FIGURE 4A, the four bits of each digit N1, N2, N3 are individually suppled to AND gates 475, 476, 477. These gates are arranged to supply a binary signal representing "0" only when all of the four inputs represent "0" (which condition represents the digit N equal to 0). The outputs of the three gates 475–477 are supplied to the inputs of another "and" gate 478, the output 432 of which receives a signal representing binary 0 when all three inputs are also 0. This signal on the output line 432 represents the condition of the counter digits NNN being equal to 0. The outputs of the gate 475–477 are also connected via individual complementer circuits 480, 481, 482 to the inputs of a buffer circuit 479. The output 432' of the buffer 479 is a binary 0 signal if any one of the inputs to the buffer 479 are binary 0. If any of the counter digits N1, N2, N3 are not equal to 0, the output of the corresponding one of the gates 475–477 is a binary signal representing "not-0." This "not-0" signal is complemented by one of the circuits 480–482 associated therewith and supplies a signal on the output line 432' representing that condition of not equal to 0.

At time $t_2$ when the N digits are checked for zero on the 81 word just explained, in the event that N is not equal to zero, a function table signal FTXFER is derived in a manner similar to that in which the previously explained signals were obtained. This is the transfer of control signal which is applied to the general control circuits to effect a transfer of control from one sequence of instructions to another.

By considering each of the other instructions in turn and by tracing the signals generated thereby through the paths of the decoding matrix 506 and the encoding matrix 507 it may easily be determined which function table signals are derived at any particular time and the effect thereof on the arithmetic unit blocks. It will be observed, for example, that in the case of any of instructions 80–83 inclusive one is subtracted from the N portion of the word being manipulated and that a transfer of control may thereby result. In the case of the 85 and 86 instructions this does not occur. In the 85 and 86 instructions, however, the sequence of events in actuality is very similar to that of any of the other series of instructions with one or two exceptions. Thus from a consideration of the encoding function table 506 it may easily be determined that when an 85 or 86 instruction is being performed it will be impossible to drive a transfer of control signal since neither of lines 523 or 524 can be activated in the absence of "set" output signals on flip-flops 503 and 504. Furthermore, line 518 cannot be activated in the absence of "set" output signals on flip-flop 503 and 504. Accordingly, even though "1" actually is subtracted from the N digits the number as thus altered is never placed back into register 410 the contents of which therefore remain in their original form.

In the 85 instruction only flip-flop 501 is set. At the end of $t_0$ this results in the generation of function signals FT102, FT121 and FT137. These initiate the regular series of events leading to the subtraction of one from the N digits of the designated addressable register. At $t_1$ function signals FTAE, FT112 and FTAF are generated and these, as in the case of any indexing instruction complete the initial subtraction process involving the N digits. At $t_2$ the signals FT123 and FT126 are generated and these respectively permit gate 426 to recirculate the adder output to AX select 411 and read the contents of register 410 to shift select 418. However, the gates corresponding to lines 523 and 524 do not become permissive in the absence of set output signals from flip-flops 503 and 504, hence the function signal FTXFER is not generated.

At $t_3$ only the gate corresponding to line 517 of decoder 506 is permitted to pass a signal again because of the absence of set outputs from flip-flops 503 or 504. Thus, while a normal shift operation takes place, function signal FT109 is not derived so that gate 429 is not permitted to replace the contents of registers 410 with the number as altered in the N digit portion thereof.

At $t_4$ the gate connected to line 519 of decoder 506 places a signal on the encoding lines giving the signals FT121, FT120 and R8. These permit gating the contents of register 410 into AX select 411, completing the shift in shifter 419 and gating the shifted number into AY select 413.

At $t_5$ the reset output from flip-flop 502 permits an output from line 520 of decoder 506 and an output is also developed from line 522 thereof. These outputs are encoded in encoder 507 thereby to develop signals FTAP, FT113 and FT114. FT113 gates the output of AY select 413 through the non-complement gate 421 and into the adder while FT114 gates the output of AX select through gate 427 into the adder. FTAP has the effect of blocking any carries which might arise between the fifth and sixth digit positions. Following a one pulse delay through delay 508, FT125 is generated which as in the previous instance permits the output of the adder to be placed into result register 423.

In the 86 instruction the same sequence of events takes place up until $t_5$. However, since in this latter instruction flip-flop 502 is set rather than reset, line 521 of decoder 506 will produce an output rather than line 520. Thus encoded signals FTAE, FT112 and FTAR are developed and the effect thereof is to perform a subtraction in the same manner as discussed previously with regard to the 81 instruction.

*Transfer of control*

As previously mentioned the indexing instructions 80, 81, 82 and 83 are capable upon the occurrence of certain events of causing a transfer of control of the computer to a new instruction routine. It will be recalled that, in connection with the discussion of the operation of the arithmetic unit, circuits are employed to manipulate the contents of a selected addressable register upon receipt of an appropriate one of the 80 series of instructions, the first step in such manipulation being that of subtracting one from the digits NNN. Immediately following this operation the digits, as reduced by one, are examined by a network such as shown by FIGURE 4A so that in the event that such digits are all zero or whether such digits are not all zero, in accordance with the instruction, a signal XFER is sent from the arithmetic unit control 130 to the control circuits 148. This signal is effective to cause a transfer of control.

Consider the 80 instruction. This is a frequently encountered indexing instruction. As hereinbefore defined this instruction will call for a transfer of control so that the location of the next instruction is determined by the M digits therein in the event that following manipulation in the arithmetic unit the N digit portion of the designated addressable register has not been reduced to zero. Since, under the most frequently encountered conditions, this will be the case (recalling that the N digits may range from 0 to 999) it will be evident that with the receipt of an 80 instruction a transfer of control is normally to be expected.

Up to a certain point in the cycle, indexing instructions proceed through the circuits in precisely the same manner as any other instruction. This will be evident from a consideration of FIGURES 10 and 11 which refer to indexing instructions wherein respectively the transfer of control signal is received and wherein no transfer of control signal is received. Assuming an 80 instruction to have appeared in the normal operating routine and been received in IR–1, the M digits thereof will, as in the case of other instructions be routed through the B-adder and the B-modification operation performed thereon. In the case of indexing instructions the other input to the B-adder will normally have zeros applied thereto. An indexing instruction during the B-modification step as will be apparent from FIGURES 10 and 11 follows the same sequence and the same timing as any other instruction. Upon passing through B-adder 139 the M digits are stored in the M address section 108 of IR–2; however, whereas the arithmetic instruction requiring the use of the memory would normally cause the aforesaid M digits emerging from the B-adder to be gated via gate 140 to address decoder 141 thereby to select an operand word from the memory, in the present instance the M digits are merely placed in section 108 of IR–2.

During the third minor cycle of the indexing instruction at $t_4$ it will be observed that the M digits from section 108 of IR–2 are set up in input–1 of the B-adder via gate gate 135 while zeros are set up in input–2 of the B-adder. At $t_6$ of the third minor cycle output of B-adder 139 is set up in control counter–2 (106) by way of gate 144 to which the function table signal FT346 is applied at $t_5$. All of the other operations which take place, however, are the same as in a normal arithmetic instruction. Thus, at $t_5$ the I digits of the instruction are gated by way of gates 132 so as to be set up at time $t_6$ in the arithmetic unit control 130.

Between $t_2$ and $t_3$ of the fourth minor cycle the transfer of control signal FTXFER is generated or not generated in the arithmetic unit control 130 as previously described. Assuming the transfer signal to have been generated, reference is made to FIGURE 1 in conjunction with FIGURE 10 for an understanding of the cycle of events which follow. At $t_0$ of the fifth minor cycle just prior to placing the results of the arithmetic unit manipulations back into the designated addressable register, signal FT405 will appear on gate 138 while signal FT411 appears on gate 153. The effect of such signals is to read the contents of control counter 106 storing the M digits of the 80 instruction just executed into the B-adder 139 along with zeros to be added thereto. At $t_2$ signal FT363 appears on gate 140 so that the M digits are set up in address decoder 141 at $t_3$ to select the next instruction. At $t_3$ signals FT401 and FT411 are applied to gates 137 and 153 respectively whereby the contents of control counter 1 (104) are subsequently added to zero in the B-adder 139. At $t_4$ the contents of control counter 2 (106) are gated into the B-adder along with zeros. At $t_5$ the contents of control counter 1 (104) emerge from B-adder 139 and are set up at $t_6$ in control counter 2 (106) by way of gate 144. At $t_6$ the previous contents of control counter 2 (106) emerge from the B-adder and are set up at $t_7$ in control counter 1 (104) by way of gates 143.

Thus, in effect the M digits of the 80 instruction just executed have been used to address the memory to select the next succeeding instruction. At the same time through use of the second control counter 106 and by exchanging the contents of the two control counters, these M digits now appear also in control counter 104 whereby the regular sequence of instructions will be hereinafter performed as determined by the M digits of the 80 instruction. The address stored in control counter 106 is that of the instruction succeeding the 80 instruction just executed and may be stored there for as long as desired. If more permanent storage is required the contents of the second control counter 106 may be transferred to a memory location upon receipt of a subsequent instruction which so specifies.

In the event that no transfer of control signal (FTXFER) is received, a somewhat similar sequence of events occurs and reference is made to FIGURE 11 for an understanding of this sequence. As in the previous case of the instruction where a transfer signal was received, the M digits stored in section 108 of IR–2 are set up in the second control counter 106 at $t_6$ of the third cycle by way of the B-adder 139 and gate 144 to which a FT346 signal is applied at $t_5$. As in the previous instance this transfer through the B-adder takes place in the third cycle, $t_4$, between the sending of the A digits to the B-adder for selecting an addressable register for the operand word and the sending of the A digits through the B-adder for the selection of the result address. As in the previous instance, signals for the encoded I digits are set up in the arithmetic unit at $t_6$ of the third minor cycle following receipt of a $t_5$ signal on gate 334 and at $t_2$ of the fourth minor cycle the transfer signal FTXFER is not generated. Again the instruction itself is carried out in the arithmetic unit as in the previous instance. However, whereas at $t_0$ of the fifth minor cycle where a transfer of control is required, the M digits from the second control counter 106 are gated to the address lines to the memory via the B-adder, in the present instance the normal routine is followed wherein the contents of the first control counter 104 storing the address of the 80 instruction just performed is sent out via gates 401 to input–1 of the B-adder to be therein augmented by one as in a normal routine and thus to select the next succeeding instruction in the regular sequence. Hereinafter the normal routine of succeeding instructions is followed and there is no exchange of contents of the first and second control counters 104 and 106, respectively. The M address which was transferred to the second control counter will, as in the previous instance, remain stored there as long as desired or it may be transferred under a special instruction to the memory via the B-adder and a gate not shown to the HSB–W or cleared by a subsequent entry into the second control counter.

Reference is once more made to FIGURE 3 for an understanding of the method by which appropriate function table signals are derived for carrying out the foregoing operations. As was previously noted with reference to the timing diagrams of FIGURES 10 and 11, the operations encountered within the apparatus of FIGURE 1 are essentially the same for all instructions up until the end of the second minor cycle. Thus, until the setting of TB flip-flop 328 from which a "set" signal is obtainable at $t_0$ of the third minor cycle the routine operations performed will be exactly the same for indexing instructions as for other instructions. However, during the third minor cycle a different series of CHJP signals will be produced from those normally encountered in other instructions. Thus, at time $t_3$ gate 361 receives a CHJP signal associated with the indexing instruction which enables it to pick up a line in the encoding function table thereby to derive signals FT402 and FT411. From FIGURE 1 it will be observed that FT402 places a permissive signal on gate 135 thereby passing the contents of section 108 of IR–2 to input–1 of B–adder 139. As in previous cases, function table signal FT411 places zeros into input–2 of B-adder 139. At $t_5$ of the third minor cycle the same CHJP signal permits gate 362 to place a signal on the line from the encoding function table which generates function table signal FT346. FT346 permits the output of the B-adder 139 to be read into the second control counter 106, thus the M digits of the instruction are now placed in the second control counter as described hereinabove. As in the case of other instructions, CHJP signals are applied to gates 327 and 329 to derive FT403 and FT411 to gate the A digits from section 107A of IR–2 through the B-adder and subsequently to register selector register 118 and also via the B-adder into selector storage 113 whereby an addressable register is selected to determine an operand and the digits are stored to determine the address of the ensuing result.

At $t_5$ of the third minor cycle the CHJP signal associated with the indexing instruction being performed enables gate 334 to drive the line in the encoding function table giving the function table signal FT300. This signal is produced in a manner similar to the production thereof for a normal instruction. Also occurring at $t_5$ and from a further CHJP signal is the enabling of gate 347 to place a set signal on instruction flip-flop 348. A set output from instruction flip-flop 348 together with a transfer of control signal FTXFER applied to gate 349 determine the ensuing series of events. At $t_7$ of this third minor cycle TB flip-flop 328 receives the reset signal and TC flip-flop 365 receives the set signal via gate 344. The respective resetting and setting of flip-flops 328 and 365 also is in accordance with the normal course of events.

Consider first of all that the transfer of control signal FTXFER is received. In accordance with the operation discussed in connection with FIGURE 4, such transfer signal will be received between $t_2$ and $t_3$ of the fourth minor cycle. Referring once again to FIGURE 3 it is noted that at this time instruction flip-flop 348 is producing a set output signal and TC flip-flop 365 is likewise producing a set output signal. The generation of the FTXFER signal in the arithmetic unit control 130 of FIGURE 1 between $t_2$ and $t_3$ enables gate 349 (FIG. 3C) to place a set input signal on C2–call flip-flop 350. At $t_3$ of the fourth minor cycle, accordingly, C2–call flip-flop 350 will produce a set output therefrom and this is directed to several locations within FIGURE 3. First of all it will be noted that C2–call flip-flop 350 has its output connected to an inhibit-input of gate 366 (FIG. 3A). Accordingly, at $t_3$ of this fourth minor cycle gate 366 will be inhibited from placing a set signal onto C1–call flip-flop 314 via buffer 309. Accordingly, the call for the next instruction comes from C2–call flip-flop 350. The output of this flip-flop 350 is connected to the inputs of gates 351 and 352. It will be observed that at $t_7$ of the fourth minor cycle TC flip-flop 365 receives a reset signal and TD flip-flop 360 receives a set signal via gate 359. While TD flip-flop 360 is regularly set and reset during the course of a normal instruction, the setting thereof is inconsequential since set outputs are required from C2–call flip-flop 350 and exchange flip-flop 354 in order to operate the gates associated with TD flip-flop 360. However, at $t_0$ of the fifth minor cycle TD flip-flop 360 will be producing a set output signal therefrom and this is applied to gates 351 and 352 along with the set signal from C2–call flip-flop 350. At $t_0$ gate 351 picks up a line in the encoding function table which generates signals FT405 and FT411. From reference to FIGURE 1 it may be seen that FT405 enables gate 138 to pass the contents of the second control counter 106 to the B-adder while FT411 passes zeros to input–2 of the B-adder via gate 153. Thus, the M digits of the instruction as stored in the second control counter are sent through the B-adder preparatory to addressing the memory for the first instruction in the new sequence.

Timing pulse $t_2$ of the fifth minor cycle passes gate 352 and generates signals FT346 and FT363. As in previous instances FT363 enables the B-adder to address the memory via gate 140 and address decoder 141. Signal FT346 allows the output of the B-adder to be gated back into the second control counter 106 via gate 144.

With the timing pulse $t_1$ of the fifth minor cycle the "set" output signal of C2–call flip-flop 350 sets exchange flip-flop 354 to which it is connected by way of gate 353. The output of exchange flip-flop 354 is thereafter available at $t_2$ of the fifth minor cycle and is connected to the inputs of gates 355, 356, 357 and 358. Other inputs of these gates received the "set" output of the TD flip-flop 360. Thus, pulse $t_3$ of the fifth minor cycle via gate 355 derives signals FT401 and FT411. These signals, as in previous instances, as may be determined from FIGURE 1, place the contents of the first control counter 104 into input 1 of the B-adder 139 while placing zeros into input 2 of the B-adder 139. Pulse $t_4$ via gate 356 generates signals FT405 and FT411. These function table signals in a like manner gate the contents of the second control counter 106 along with zeros into the respective inputs of the B-adder 139. Pulse $t_5$ via gate 357 generates function table signal FT346. At this time the output of the B-adder will comprise the former contents of the first control counter 104 to which zeros have been added and function table signal FT346 enables this output to be read into the second control counter 106 via gate 144. Finally pulse $t_6$ via gate 358 develops signal FT345. This enables gate 143 to pass the ensuing output of the B-adder which, at this time, comprises the former contents of the second control counter 106 into the first control counter 104. Accordingly, by means of the exchange flip-flop and the gates associated therewith the contents of the two control counters are exchanged. By means of the C2–call flip-flop 350 the memory is addressed for a new instruction determined by the M digits of the indexing instruction just carried out. Thereafter, the normal routine is followed. Thus, as in the case of any other instruction the contents of memory location M representing the next instruction will be available to be set up in the first instruction register 101 at $t_2$ of the next minor cycle.

It is also to be noted that the output of the C2–call flip-flop is applied to buffer 315 whereby the delay flip-flop 317 is set in the same manner as it would otherwise be set by an output from the C1–call flip-flop 314. Thus, a cycle of the timing flip-flops TA–TD is initiated and the normal chain of events occurs hereinafter. If it is now assumed that an indexing instruction was received which failed to generate the FT–XFER signal it will be seen that during the third minor cycle CHJP signals would be effective as in the case where a transfer signal was received to generate signals FT402 and FT411 via gate 361 at the end of $t_3$ and to generate the FT346 signal at $t_5$ via gate 362. These signals, of course, are effective to pass the M digits of the instruction from section 108 of IR–2 through the B-adder along with zeroes and to read these M digits into the second control counter 106 via gate 144. Furthermore, at $t_5$, signal FT300 would be generated thereby to gate the encoded instruction digits into AU control 130 via gate 132. Also at $t_5$ the instruction flip-flop 348 is set. However, since no FT–XFER signal is received during the fourth minor cycle C2–call flip-flop 350 is not set. Accordingly, the inhibit signal is not placed on gate 366 so that the call for the next instruction in this event originates from the C1–call flip-flop 314. Accordingly, the progression of events in this latter instance is simply that of a normal instruction whereby the next instruction in the regular sequence is taken from the first control counter 104.

Having considered the general overall operation of a computer with respect to indexing instructions and having considered the operation and the function of some of the elements forming the circuits of the general block diagrams, it is now proposed to examine in somewhat greater detail the basic components forming the computer.

In general, such components are, in themselves, well-known elements at least as regards their logical design and operation. Thus, for example, FIGURE 1, in addition to showing a memory, shows a number of blocks indicating registers, counters and an adder.

The registers, such as instruction register 101 or instruction register 2, shown by blocks 107 and 108, may comprise little more than an array of flip-flops wherein instruction register 101 would comprise sixty such flip-flops thereby to store sixty binary digits (5 bits for each of 12 decimal digits, the code representation being, for example, a 5–4–2–1 code with the most significant bit serving as an odd-even check) which are applied thereto. The second instruction register formed by blocks 107 and 108 could similarly be formed from a plurality of flip-flops in this case, however, forty-five such flip-flops (5 for each of 9 decimal digits) would be required. It will be recalled in the discussion of the instruction word that while such was represented as comprising twelve digits, eleven only of such digits have been specifically used in the instruction word, and it may be observed that the twelfth digit, which occurs in the most significant digit position may be regarded, for the present purposes, as a sign digit in the operand word. Such digit may have additional uses, not related to this invention, in the instruction word format. Since the second instruction register does not store either the B digits or the digit occurring in the most significant digit position it will be evident that only forty-five flip-flops will be required in this particular instance. In this latter regard it should be noted that the portion 107 of instruction register 2 may comprise twenty such flip-flops and the portion 108 may comprise twenty-five such flip-flops.

The register selector register 118 may also comprise a plurality (10) of flip-flops to store either A or B digits (2 decimal digits) of an instruction representing the address of an addressable register to be selected. Also selector storage 113 may comprise a plurality (10) of flip-flops for storing the address (2 decimal digits) of an addressable register 121 which will eventually be selected to receive a result.

The two control counters 104 and 106, respectively, may also comprise registers. Such registers may be considered as representing the accumulator portion of the counter. The entire counter is obtained through the combination of these particular registers with the B-adder 139. Again these particular registers may comprise an array of flip-flops each register capable of storing five decimal digits which in the present case correspond to twenty-five binary digits.

The B-adder 139 comprises a parallel adder capable of accommodating five decimal digits on each input. Such an adder may take the form of the adder described hereinafter with reference to FIGURE 7 with additional delay elements provided for timing purposes only. Adders are themselves well known in the prior art and it is not thought to be necessary in the present instance to specify the design of such an adder to any substantial detail. For details of various suitable types of adders regarding the logical design thereof, reference is made to chapter 8 in the textbook "Arithmetic Operations in Digital Computers" by R. K. Richards (Van Nostrand) and also to chapters 4 and 13 in the textbook "High Speed Computing Devices" by the staff of the Engineering Research Associates, Inc. (McGraw-Hill).

Decoders and encoders have been discussed generally in connection with some of the more detailed circuits described hereinabove. Thus, the fast register selector decoder 120 may comprise a gating matrix enabling the selection of any one of the addressable registers 121. Similarly, the address decoders 141 may likewise be formed by gating matrices of the type described. Suitable forms of these are well known to those skilled in the art.

The addressable registers, as in the case of other registers, may be considered as comprising in each case sufficient flip-flops, i.e. sixty, to store a complete computer word and to enable a parallel read-in and read-out of such computer word.

It will be realized that in order to provide a complete computer many additional gates will have to be provided other than those already shown. However, again in the interests of simplicity and ready understandability, such gates have not been specifically shown on the drawings except where they are especially necessary for following through an instruction with proper timing of entries and exits to the various components employed in such instruction.

If reference is made to FIGURE 3, it is apparent that a $t_5$ pulse will be applied to both the set input and the reset input of the flip-flop 348. This flip-flop and others expected to receive similarly timed inputs to both the set and reset inputs thereof are so designed that the application of a set input thereto will always set the flip-flop notwithstanding the simultaneous appearance of a pulse upon the reset input line. FIGURE 6 shows a typical design for a flip-flop which may be employed within the present invention.

An input line 601 feeds a buffer inverter 602 in FIG. 6. Reset input line 608 is likewise shown feeding a buffer inverter 609. Such buffer inverters may be formed from transistors for example as shown in U.S. application Serial No. 673,224, now U.S. Patent No. 2,949,543, issued April 16, 1960, and are characterized in that for any input exhibiting a relatively high level an output will be produced therefrom at a relatively low level. If all inputs however are at a low level an output at a relatively high level will be produced. The pulse former amplifier 604 to which the output from buffer inverter 602 is fed by way of line 603 is likewise an inverter whereby high level inputs applied thereto will result in low level outputs on the set output line 605 and will be complemented to produce corresponding high level outputs on reset output line 606. A feedback path 607 is provided by the output line 606 from pulse former 604 and a further input to buffer inverter 609.

Considering the operation of FIGURE 6 it is assumed that the normal potential levels on set input line 601 and reset input line 608 will be low. Now if a pulse in the form of a step to a substantially higher potential level is applied to inverter 602 a low level output will appear on line 603. This low level output is applied to pulse former 604 and appears on set output line 605 as a high level and at the same time on reset output line 606 as the corresponding oppositely directed level. The output from reset line 606 upon being fed back along line 607 is applied to buffer inverter 609. Since the other signal applied to buffer inverter 609 is normally at a low level it is apparent that a high level output will appear on line 610. This, in turn, is subsequently inverted by inverter 602 and it appears as a further low level input at pulse former 604 whereby the high level initiated by the application of a pulse to input line 601 results in a high level output on set line 605.

Because of the fact that element 602 provides an inverting function it will be apparent that further high level signals appearing on line 601 will have no further effect on the output of line 605 which will remain high. It is further apparent that if simultaneous high level inputs are applied to both set and reset lines 601 and 608, the inputs to buffer 602 are respectively high and low. However, the high level signal will prevail and will be inverted to produce the low level signal on line 603.

However, if in the absence of a high level signal on set input line 601, a high level input is applied to reset line 608, it will be apparent that a low level signal from inverter 609 will appear on line 610. The presence of a low level signal on input 601 will cause inverter 602 to provide a high level output on line 603. The high level input to pulse former 604 will thereafter produce a low level output on set output line 605 and a high level signal on the reset output line 606. Thus, the flip-flop will be reset.

Consider now the arithmetic unit components as shown in block form by FIGURE 4. As in the case of FIGURE 1 these components are well-known in the prior art. Register 410 may be similar to other registers hereinbefore described in that it may comprise a plurality of flip-flops.

AX selector 411 and AY selector 413 are inputs to adder 412. Since, as previously described in connection with FIGURE 4, it is necessary that the arithmetic unit perform many different functions involving the use of the adder, it is necessary to provide an arrangement whereby a variety of inputs may be accommodated. Thus, both AX select 411 and AY select 413 simply comprise arrays of buffers or "or" gates whereby it is possible to provide many different inputs to the adder.

Another component found within the arithmetic unit and required for the instructions provided by this invention are the complement and non-complement gates 414 and 421, respectively. Inasmuch as words are expressed in a coded decimal form such as for example the 5–4–2–1 code, complementing thereof may take place in an arrangement of gates and buffers such as is described in chapter 6 on decimal codes in the textbook "Arithmetic Operations in Digital Computers" by R. K. Richards. Thus, if an individual digit is expressed as $T_5T_4T_2T_1$ its nines complement $C_5C_4C_2C_1$ may be obtained by a logical arrangement of gates and buffers to express the function $$C_1 = T_1$$
$$C_2 = T_2 \cdot \overline{T}_1 + \overline{T}_2 \cdot T_1$$
$$C_4 = \overline{T}_4 \cdot \overline{T}_2 \cdot \overline{T}_1$$
$$C_5 = \overline{T}_5$$

The adder 412 found in the arithmetic unit is in most respects a conventional twelve digit parallel adder. However, because of the peculiar requirements of the instructions of this invention it is considered desirable to give a somewhat detailed description of this particular component. Accordingly, reference is now made to FIGURE 7. FIGURE 7 shows some of the components already discussed with reference to FIGURE 4 but shows in detail a parallel adder arrangement wherein it is possible to insert or to block carries into certain digit positions under certain conditions. Thus, from FIGURE 7 outputs are shown gated from AX select 411 via gates 427 and AY select 413 via gates 414 or 421 into a plurality of decimal digit adders 701. Since the word contains twelve digits, twelve such digit adders are shown. It will be recalled that on the first passage through the adder of the A operands or any of the 80 series of instructions, "1" was subtracted from the counter digits NNN. To accomplish this it was necessary to pass zeros into the AY select 413, pass such zeros through the complementer gate 414 add a "1" to the least significant digit position and block carries into the tenth digit position. All of the foregoing operations may be readily performed with the apparatus shown by FIGURE 7. It is noted that each of the digit adders is provided with three output lines. One of these output lines represents the sum, one represents the carry and the third one gives an indication of the presence of a nine as the value of the sum. The carry lines and the nine lines are applied to a block 702 labelled "carry net." The carry net is for the purpose of providing a fast propagation of carries throughout the adder and such carry net may comprise a gating and buffing array. When a nine is detected as the sum in any particular digit position the carry originating from the preceding digit position may be propagated past the digit position containing the nine. Thus, if as the result of an addition a plurality of nines were to occur in all but the most significant digit position of the sum and a carry were placed into the least significant digit position, rather than the necessity of propagating each individual carry, a single carry would be propagated through the entire array of digit positions. The purpose of such an arrangement of course is to conserve time. Appropriate forms of arrangements for propagating carries are well known in the art and are described for example, in Richards' "High Speed Computing Devices," chapter 8 and particularly at pages 218 and 219. The unit adders perform the function of adding carry digits to sum digits. However, in view of the peculiar operations of the 80 series of instructions it is necessary to block certain of the carry lines and the nine lines under certain conditions. Thus, considering once again the necessity for blocking the carry into the tenth digit position upon subtraction of one from the N digits, it will be seen that the outputs of the digit adder in the ninth digit position are arranged somewhat differently. The sum output line goes directly to the corresponding unit adder 703, however, the carry line is provided with an inhibition gate 705 and the nine line is provided with an inhibition gate 704. These gates are inhibited by the application thereto of the AF function table signal as previously described in FIGURE 5. It will be seen that when the first subtraction which may occur in an indexing instruction is to be performed which of course is the addition of a complement, no carry can be sent from the ninth digit. Similarly, if the ninth digit of the sum happened to be a nine this fact could not be communicated to the carry net because of the inhibition gate 704. Accordingly, carries which might have arisen from the previous digits could not propagate past the ninth digit position.

A similar problem occurs in the 80 series instructions during the addition or the subtraction of the increment DDDD to or from the modifier digits bbbbb. As hitherto explained the problem here occurs between the fifth and sixth digit positions. Accordingly, the fifth digit adder is provided with inhibition gates on its carry and nine output lines 707 and 706 respectively. These operate in substantially the same manner as the inhibition gates 705 and 704 applied to the ninth digit add; that is, FTAP blocks any carry originating from the fifth digit position. In addition, however, it will be recalled that under the 81, 83 and 86 instructions it may be necessary to force or stuff a carry into the sixth digit position. For this purpose buffer 708 is shown in the carry line coming from the digit adder of the fifth digit position. The function table signal AR, when received, passes buffer 708 into the carry line C like a carry pulse and is effective to force a carry into the sixth digit position. Other function table signals are applied as shown and the manner of generating these may be determined from an inspection of FIGURE 5 and the foregoing description pertaining thereto.

One further portion of the arithmetic unit is the shifter 419. It will be recalled that this shifter performs the necessary shifts whereby the D digits of the number being operated upon are placed into the least significant digit positions and all remaining digits are discarded whereby the D digits may be readily added to or subtracted from the *b* digits. Thus, shifter 419 is effective in two stages of operation to perform first a left shift of three digit positions and second a right shift of eight digit positions. FIGURE 8 shows the details of a digit shifter adapted to carry out the foregoing operations.

It will be apparent from FIGURE 8 that the shifter 419 comprises a plurality of buffer elements wherein there are three arrays, for each array comprising twelve such buffer elements, or one for each digit concerned. Considering that the shifter, with reference to all the various instructions which the computer is capable of executing, can manage many different shifts it will be apparent that many more inputs than those actually shown may be provided. However, for the present purposes we are concerned only with the specific shifts automatically performed upon receipt of the 80 series of instructions and for this reason only those inputs specifically required are shown.

The first array in the shifter comprises the buffers 801, and twelve such buffers are shown corresponding respectively to the twelve digits. The buffers 801 and the gates 417 and 430 controlling the respective inputs to such buffers correspond to the shift selector block 418 in FIGURE 4. Two inputs are shown to such block, one of which is derived from the AF register 410 and the other of which represents the shifter recirculation line. Thus, on the receipt of the FT126 function table signal the contents of AF register 410 are gated into buffers 801. A line of pulse amplifiers 810 is provided for furnishing the required amount of drive.

The next buffer array comprises buffers 803. These perform a first stage in the shifting process. In a full scale shifter for performing all of the generalized operations of the arithmetic unit, a first stage buffer array corresponding to buffers 803 will be arranged to effect either a zero shift or a left or right shift of three, six or nine positions. The final buffer array corresponding to buffers 805 will be arranged to effect a zero shift or a right or left shift of one or two positions. The complexity of detail for such a generalized shifter is omitted from FIGURE 8 to simplify the explanation of this invention.

From FIGURE 8 it will be observed that each of the buffers 803 is provided with a pair of input gates 804 and 808, respectively. The gates 804 are activated by an L3 function table signal on one input and the second inputs are connected to outputs of pulse formers 810 as indicated, that is $X_1$–$X_9$ going respectively to $Y_4$–$Y_{12}$ and zeros going to the others. The gates 808 are activated by an R8 function table signal on one input and by second inputs connected as indicated to outputs from pulse formers 810, that is $X_7$–$X_{12}$ going to $Y_1$–$Y_6$ respectively and zeros going to the others. The significance of these gates and their indicia will become apparent hereinafter.

The buffer array comprising buffers 805 is the final buffer array in the shifter. Each of the buffers 805 is provided with a pair of input gates 806 and 809 respectively. The input gates 806 are activated by a function table signal L3 and by second inputs connected to outputs of buffers 803 as indicated. The gates 809 are activated by a function table signal R8 and second inputs connected to outputs of buffers 803 as indicated.

When a number is transmitted to the shifter along the input lines thereto, the FT126 signal will be derived at the appropriate time as hereinbefore discussed with respect to FIGURE 5. Such function table signal permits each of gates 417 to pass therethrough the respective digits of the number coming through the input lines, the usual order of the input lines from register AF being followed with the least significant digit on the right in FIGURE 8. It will have been observed that each of the buffers 801 is provided with an output line numbered respectively $X_1$ to $X_{12}$ corresponding to the relative significance of the digit position within the numbers being passed therethrough. Similarly numbered are the output lines from the buffer arrays comprising buffers 803 and 805, the output lines from buffers 803 being numbered $Y_1$ to $Y_{12}$ and the output lines from buffers 805 being numbered $A_1$ to $A_{12}$. Input gates 804 providing one of the two inputs shown to buffers 803 require, in addition to the L3 function table signal, the application thereto of a signal from the appropriate buffer from the array comprising buffers 801. The appropriate buffer is determined by subtracting three from the number of the buffers 803. Thus, the buffer 803 in the seventh digit position would have its input gate 804 connected to the output of the fourth buffer of the array of buffers 801. This is indicated on the drawing wherein such gate has as one input thereto the signal derived from $X_4$. The third buffer, second buffer and first buffer of the array 803 would, of necessity, find no corresponding outputs from the array comprising buffers 801. Accordingly, signals representing decimal zeros are applied to their input gates 804 along with the gating signal L3. These zeros may be obtained from zero register 450 of FIGURE 4 or from a zero register (not shown) within the shifter itself. It will be apparent that when the number has been passed through the array of buffers 803 the most significant group of digits $Y_{12}$–$Y_4$ now appearing therein will be derived from the digit positions $X_9$–$X_1$ respectively, of the originally furnished number and the least significant digit positions $Y_1$, $Y_2$, $Y_3$, will be filled with zeros.

The application of the L3 function table signal to input gates 806 of the buffer array comprising buffers 805 causes a zero shift to be effected. Thus, the number emerging on the output lines of the buffer array 805 will be the same as the number coming from the output lines of buffer array comprising buffers 803. Gates 806, therefore, are simply connected to the output of the corresponding buffer in the previous array. Thus, by its first passage through the shifter with connections and gating arrangements as shown, the number will be shifted left three digit positions.

The number emerging on the output lines of buffers 805 is thereafter lead back along recirculation lines where it is applied via gates 430 to which an FT128 function table signal is supplied thereby to pass the number in its initially shifted form back into the shifter. It will be recalled from FIGURE 5 that subsequent to the application of the L3 function table signal the R8 function table signal was provided. From FIGURE 8 it will be seen that function table signal R8 enables gates 808 to pass signals when such signals are appropriately applied to their other input. Each such other input is connected as indicated to receive either a zero or the output of one of the pulse formers 810. In effect, each gate 808 derives its information input from the output of the appropriate buffer 801 determined by adding six to the number of the stage at which each gate 808 occurs. Thus, buffer 803 in the least significant digit position in the array will have its input gate 808 pick up an information input signal from the output of the seventh buffer ($X_7$) of the array of buffers 801. Since only twelve buffers are provided in each array, it will again be apparent that the buffers 803 corresponding to digit positions seven to twelve inclusive can find no outputs from any of buffers 801. Accordingly, zeros are placed on their inputs. From the foregoing it is seen that the effect of passing a number through buffers 803 by way of gates 808 is to shift the number right by six digit positions. Thus, the six least significant digits are lost and zeros are placed in the six most significant digit positions.

As thus shifted right six digit positions the number is applied to gates 809 providing a second input to the buffer array comprising buffers 805. Gates 809 are, in a manner similar to gates 808, activated by the R8 function table signal. By essentially the same process as in the previous instance the number is again shifted right two digit positions so that two more of the least significant digits are lost and two further zeros are shifted into the most significant digit positions.

The number appearing on the output lines of the buffers 805 following the second passage through the shifter has now been shifted left three digit positions, thereby to cast off the digits NNN, and has subsequently been shifted right eight digit positions which cancels out the previous left shift of three positions and provides an additional right shift of five digit positions. This final operation, of course, obviously casts off the digits *bbbbb*, and places the digits DDDD into the least significant digit positions and fills up the remaining positions with zeros.

From the foregoing considerations it will be apparent that a digital computer has been provided wherein the operation of indexing or B-modification is particularly flexible in view of the particular apparatus provided. The relatively large number of indexing instructions provided can be combined with each other and with other instructions by the programmer so that problems involving program loops will be considerably simplified.

Because of the large number of addressable registers which are provided it is possible to run a very large number of repetitions on a single loop. Thus, if the loop were to be set up so that following each traversal thereof an 80 instruction was received it is seen that by use of a single addressable index register and with $NNN=000$ initially, 1,000 traversals of the loop would be possible before NNN is again 000 and that portion of a program is completed. However, by employing a second addressable register which, following each thousand traversals of the loop, as controlled by the first index register, and using such second addressable index register to determine when transfer out of the loop is to take place, it is possible to provide up to 1,000,000 traversals of a given program loop.

It will be seen that the use of addressable registers as in the present system provides flexibility inasmuch as arithmetic operations may be performed on the contents of such registers whether they are storing indexing words or operands used in a sequence of the more usual instructions. At the discretion of the programmer it is possible within a desired routine to "compound" indexing instructions so that loops within loops may be effected. Thus, one addressable register can serve as an indexing master for the overall loop so as to provide B-modification and transfer of control when required while a plurality of further addressable registers may serve to control repetitions of loops within the overall loop.

In operating the machine under a typical program requiring indexing normally the addressable registers will be filled from the memory initially. Such filling of the registers is accomplished through the use of simple fetch instructions serving this purpose (for example, the fetch path may be via the HSB–R, through the gate 146 and M input register 150, through the arithmetic unit 131 and gate 126 to the addressable registers 121). Thereafter a regular sequence of instructions in accordance with the desired program may be set forth and such program may, of course, be interspersed with indexing instructions wherever repetitive program loops are encountered. With the payroll example suggested in the introduction it may be seen that an 80 instruction would serve the indexing purposes required. In the addressable register used in such an example as an indexer the N digits therein would represent the number of employees and would correspond to the number of program loops. The number expressed by the D digits would correspond to the number of steps required in determining each employee's final wage. The *b* digits would at the beginning of the computation be zeros so that the first traversal of the program loop would use the instructions with their operand addresses as originally written into the memory. Subsequent traversals of the program loop following each receipt of an 80 instruction would result in the *b* digits being successively increased by the amount of the D digits while the N digits were successively decreased by one for each loop traversal.

Other examples of the use of the indexing instructions will readily suggest themselves to programmers and other skilled in the digital computer art. It is, therefore, apparent that a flexible and powerful indexing system has been provided for digital computers. While only one specific example has been shown of apparatus for carrying out the invention, other examples may suggest themselves to those skilled in the art. Accordingly, the instant invention is intended to be limited only by the extent of the claims attached hereto.

What is claimed is:

1. A stored program digital computer comprising a memory for storing instructions and operands, means for selecting said instructions in a predetermined sequence, circuits for manipulating said operands in response to said instructions, at least one register for storing operands capable of modifying said instructions, means to effect a direct alteration of one portion of the contents of said register by another portion of the currently existing contents of said register in response to an instruction and means responsive to the altered contents of said register for predetermining the subsequent sequence of instructions.

2. A stored program digital computer comprising an addressable memory for storing operands and instructions, sequencing means for addressing said memory thereby to determine a sequence of operating instructions to be extracted therefrom, instruction responsive means for addressing said memory thereby to extract operands therefrom, means for manipulating said operands in response to said instructions, at least one register for storing operands or instruction modifying factors, means for effecting a direct alteration of a portion of the contents of said register with another portion of the currently existing contents of said register in response to an instruction, and control means responsive to a further portion of the contents of said last mentioned register to control the number of said alterations, in response to said instruction.

3. A stored program digital computer comprising an addressable memory for storing operands and instructions, a plurality of addressable registers for storing operands and instruction modifying factors, said instructions having a command portion, first and second address portions for addressing said registers and a third address portion for addressing said memory, means for modifying said third address portion in accordance with an instruction modifying factor stored in a selected addressable register, sequencing means for addressing said memory to determine a first sequence of instructions to be extracted therefrom, condition responsive means actuable by an instruction for effecting a direction alteration of a portion of the contents of a selected addressable register storing an instruction modifying factor with another portion of the currently existing contents thereof and control means responsive to a further portion of the contents of said last mentioned addressable register to control the number of said alterations, in response to said instruction.

4. A stored program digital computer comprising an addressable memory for storing operands and instructions, a plurality of addressable registers for storing operands, said instructions having a command portion, first and second address portions for addressing said registers and a third address portion for addressing said memory, sequencing means for addressing said memory to determine a first sequence of instructions to be extracted therefrom, adder means for altering the third address portion of said instructions in accordance with the contents of an addressable register selected by said instructions, means for effecting a direct alteration of a portion of the contents of a selected addressable register with another portion of the currently existing contents of said addressable register in response to an instruction, means responsive to the altered contents of said selected addressable register to determine succeeding sequences of instructions in accordance with the third address portion of said altering instruction so that said first sequence of instructions may be repeatedly performed with altered third address portions for each repetition and responsive to the altered contents of said selected register for determining the number of repetitions of said first sequence of instructions.

5. In a stored program digital computer, an addressable memory for storing instructions and operands, sequencing means for addressing said memory to determine a sequence of instructions to be extracted therefrom wherein said instructions include a command portion and first, second and third address portions, at least one addressable register for storing a control operand, said control operand including a counting factor, an increment factor and a modifier factor, adder means for applying said modifier factor to the third address portion of an instruction thereby to modify said instruction in a predetermined manner, instruction responsive means for effecting a direct alteration of said modifier factor with said increment factor and for diminishing said counter factor and means jointly responsive to said diminished counter factor and to the instruction which effected the change therein for determining a further sequence of instructions.

6. In a stored program digital computer according to claim 5, wherein said instruction responsive means includes means for adding said increment factor to said modifier factor.

7. In a stored program digital computer according to claim 5, wherein said instruction responsive means includes means for subtracting said increment factor from said modifier factor.

8. In a stored program digital computer according to claim 5, means for selecting an addressable register containing a desired modifier factor, said means comprising a decoding circuit responsive to the second address portion of the instruction to be modified.

9. A stored program digital computer comprising an addressable memory for storing operands and instructions, a plurality of addressable registers for storing operands, said instructions having a command portion for controlling the operation of the computer, a first address portion for selecting a designated register, a second address portion for selecting a designated register and a third address portion for selecting a designated memory location, an instruction register for receiving instructions from said memory and staticizing said instructions, means responsive to the transfer of an instruction into said instruction register for selecting the addressable register designated by said second address portion of said instruction, means for applying a portion of the contents of said addressable register to said third address portion of said instruction, means for effecting a direct alteration of a portion of the contents of a selected addressable register with another portion of the currently existing contents of said addressable register in response to an instruction, means for testing the contents of said specified addressable register during the alteration of said contents and deriving a signal as a result of the testing and means jointly responsive to the derived signal and to said predetermined instruction for determining the next instruction to be executed by said computer.

10. The computer of claim 9 wherein said addressable register designated by the second address portion of an instruction or the first address portion of said predetermined instruction store a control operand comprising a modifier factor, an increment factor and a counter factor, said applying means comprising an adder for adding said modifier factor to said third address portion of any instruction which designates an addressable register by its second address portion.

11. The computer of claim 10 wherein said altering means comprises means for adding said increment factor to said modifier factor in accordance with one of a set of predetermined instructions.

12. The computer of claim 10 wherein said altering means comprises means for subtracting said increment factor from said modifier factor in accordance with one of a set of predetermined instructions.

13. The computer of claim 10 wherein said altering means comprises means for subtracting unity from said counter factor and adding said increment factor to said modifier factor in accordance with one of a set of predetermined instructions.

14. The computer of claim 10 wherein said altering means comprises means for subtracting unity from said counter factor and subtracting said increment factor from said modifier factor in accordance with one of a set of predetermined instructions.

15. The computer of claim 10 wherein said testing means comprises means for detecting whether or not said counter factor is reduced to zero as a result of the alteration of the contents of said specified addressable register.

16. The computer of claim 15 wherein the reduction of said counter factor to zero produces a signal and means responsive jointly to the presence of said signal and the command portion of either of two of a set of predetermined instructions, effective to produce the required signals so that the next instruction to be executed is determined by the third address portion of said either of two of a set of predetermined instructions.

17. The computer of claim 15 wherein the reduction of said counter factor to zero produces a signal and means responsive jointly to the presence of said signal and the command portion of either of two of a set of predetermined instructions effective to produce the required signals so that the next instruction to be executed is determined by the memory address of said either of two of a set of predetermined instructions.

18. A stored program digital computer comprising an addressable memory for storing operands and instructions, a plurality of addressable registers for storing operands, at least one instruction register for staticizing instructions, said instructions having a command portion and first, second and third address portions, a control unit for deriving control signals from the command portions of said instructions, an arithmetic unit for performing operations on said operands in accordance with said instructions, at least one control counter for sequencing the addresses of instructions to be extracted from the memory and placed in the instruction register, means associated with said addressable registers for selecting one of said registers according to the second address portions of said instructions and for extracting from a selected register a portion of the contents thereof, an adder for adding said portion of the contents to the third address portion of the designating instruction whereby said instruction is altered, means within said arithmetic unit for altering the contents of an addressable register as selected by the first address portion of one of a series of predetermined instructions, the contents including a counter factor, an increment factor and a modifier factor, said arithmetic unit including at least an adder, and a tester so that in response to one of said series of predetermined instructions the contents of an addressable register as designated are altered by subtracting unity from the counter factor and thereafter either adding or subtracting the increment factor to or from the modifier factor as determined by the instruction, said tester determining whether or not following the subtraction of unity said counter factor has been reduced to zero and means responsive to the output of said tester and to the command portion of one of said series of predetermined instructions effective to determine a subsequent sequence of instructions to be performed.

References Cited by the Examiner

UNITED STATES PATENTS

| | | | |
|---|---|---|---|
| 2,800,277 | 7/1957 | Williams et al. | 235—157 |
| 2,810,516 | 10/1957 | Tootill et al. | 235—157 |

ROBERT C. BAILEY, *Primary Examiner.*

CORNELIUS D. ANGEL, DARYL W. COOK, MALCOLM A. MORRISON, *Examiners.*